(12) United States Patent
Uchida et al.

(10) Patent No.: US 8,541,508 B2
(45) Date of Patent: Sep. 24, 2013

(54) EPOXY GROUP-CONTAINING COPOLYMER, EPOXY (METH)ACRYLATE COPOLYMER USING THE SAME AND THEIR PRODUCTION PROCESSES

(75) Inventors: Hiroshi Uchida, Minato-ku (JP); Kazuhiko Ooga, Minato-ku (JP); Toshio Fujita, Minato-ku (JP); Masanao Hara, Minato-ku (JP)

(73) Assignee: Showa Denko K.K., Tokyo (JP)

( * ) Notice: Subject to any disclaimer, the term of this patent is extended or adjusted under 35 U.S.C. 154(b) by 176 days.

(21) Appl. No.: 13/057,425

(22) PCT Filed: Aug. 7, 2009

(86) PCT No.: PCT/JP2009/064051
§ 371 (c)(1),
(2), (4) Date: Feb. 3, 2011

(87) PCT Pub. No.: WO2010/016585
PCT Pub. Date: Feb. 11, 2010

(65) Prior Publication Data
US 2011/0144279 A1    Jun. 16, 2011

(30) Foreign Application Priority Data

Aug. 8, 2008  (JP) .................................. 2008-206114
Nov. 28, 2008  (JP) ................................ 2008-305179

(51) Int. Cl.
*C08F 218/12* (2006.01)
*C08F 224/00* (2006.01)
*C08F 8/10* (2006.01)
*C08F 8/14* (2006.01)

(52) U.S. Cl.
USPC ........ 525/301; 525/312; 525/327.3; 525/386; 526/268; 526/273; 526/319; 526/320; 526/329; 526/331

(58) Field of Classification Search
USPC .............. 525/301, 327.3, 386, 312; 526/268, 526/273, 319, 320, 329, 331
See application file for complete search history.

(56) References Cited

U.S. PATENT DOCUMENTS

| | | | |
|---|---|---|---|
| 799,913 | A | 9/1905 | Mayse |
| 5,122,586 | A | 6/1992 | Sakai et al. |
| 2009/0030217 | A1 | 1/2009 | Uchida et al. |

FOREIGN PATENT DOCUMENTS

| | | |
|---|---|---|
| EP | 0 331 183 B1 | 6/1995 |
| JP | 52-003686 | 1/1977 |
| JP | 53-092888 | 8/1978 |
| JP | 54-159492 A | 12/1979 |
| JP | 60-166675 A | 8/1985 |
| JP | 06-041275 A | 2/1994 |
| JP | 7-86726 A | 3/1995 |
| JP | 08-291214 A | 11/1996 |
| JP | 2926429 B2 | 5/1999 |
| JP | 2002-284842 A | 10/2002 |
| JP | 2004-51860 A | 2/2004 |
| JP | 2006-316034 A | 11/2006 |
| JP | 2007-204642 A | 8/2007 |
| JP | 2007-310060 A | 11/2007 |
| JP | 2008-297448 | * 12/2008 |
| JP | 2008-297448 A | 12/2008 |
| WO | 2006/123814 A2 | 11/2006 |
| WO | 2007/132724 A1 | 11/2007 |

OTHER PUBLICATIONS

Machine translation of JP 2008-297448, Dec. 2008.*
Han et al.; Study on synthesis and photo-polymerization characteristics of *o*-hydroxycyclohexyl methacrylate; J. Radiat. Res. Radiat. Process; vol. 26, No. 2, Apr. 2008; pp. 112-115.
European Search Report dated Oct. 8, 2012, for Application No. 09805067.7-1214 / 2314634.

* cited by examiner

*Primary Examiner* — Roberto Rabago
(74) *Attorney, Agent, or Firm* — Sughrue Mion, PLLC

(57) ABSTRACT

According to the present invention, a novel epoxy group-containing copolymer, including a production process thereof, and an epoxy (meth)acrylate copolymer starting from the epoxy group-containing copolymer, including a production process thereof are provided. The epoxy group-containing copolymer of the present invention contains a specific epoxy group-containing repeating unit and an olefin-based repeating unit. A novel epoxy (meth)acrylate copolymer of the present invention is produced by reacting the epoxy group-containing copolymer with (meth)acrylic acid.

7 Claims, 12 Drawing Sheets

EPOXY GROUP-CONTAINING COPOLYMER, EPOXY (METH)ACRYLATE COPOLYMER USING THE SAME AND THEIR PRODUCTION PROCESSES

TECHNICAL FIELD

The present invention relates to a novel epoxy group-containing copolymer excellent in electrical insulation, promising utilization in the fields of, for example, an electrical insulating material, such as a solder resist and an interlayer insulating film, an encapsulant of IC and VLSI, and a laminated sheet, and a production process thereof. The present invention also relates to an epoxy (meth)acrylate copolymer obtained by reacting the epoxy group-containing copolymer above with (meth)acrylic acid, which is free from a low volatile monomer, such as styrene, and curable by either light or heat, promising utilization in the fields of, for example, an electrical insulating material, such as a solder resist and an interlayer insulating film, an encapsulant of IC and VLSI, and a laminated sheet, and which has not only well-balanced flexibility and toughness but also excellent low dielectric characteristics, adherence, water resistance, heat resistance, chemical resistance, electrical insulation and the like, and a production process thereof.

BACKGROUND ART

Recently, significant progress has been made in the polymer industry, which has resulted in use of varied and diverse polymer materials over a wide range. In particular, with the enhancement in function and performance of industrial products, development of a more excellent polymer material is proceeding.

Among such materials, an epoxy resin has wide industrial applications as a thermosetting resin or other reactive resins and has been studied and developed from various aspects. The epoxy resin that is most widely used in the industry at present is a bisphenol A-type epoxy resin produced by the reaction of bisphenol A and epichlorohydrin.

This resin includes a wide range of liquid to solid products, and is also excellent in reactivity, chemical resistance, toughness, adhesion, heat resistance and the like, and therefore it finds extensive uses, for example, in civil engineering, architecture, coatings and adhesives. However, since the bisphenol A-type epoxy resin is obtained by the reaction of bisphenol A and epichlorohydrin, tens of ppm to 100 ppm of chlorine is contained in the resin, and this brings about a problem, such as impairment of electrical characteristics of an electric component. Furthermore, with the recent reduction in size and weight of an electrical component, a flexible wiring board becomes increasingly popular, and flexibility is also required of the insulating resin itself so as to reduce the thickness and weight. Accordingly, an epoxy resin free from chlorine and balanced in the electrical characteristics, heat resistance and flexibility is demanded.

An alicyclic epoxy resin is known as a chlorine-free resin, and a compound represented by the following formula (e) or (f):

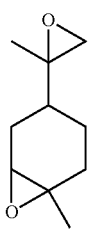

(e)

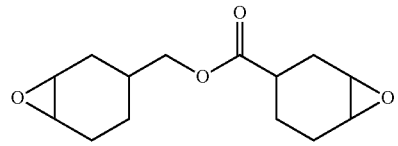

(f)

is industrially produced and used as a raw material of the alicyclic epoxy resin. Such a material has a high glass transition temperature and excellent heat resistance but is disadvantageously low in flexibility.

As for other epoxy resins containing reduced residual halogen, there have been proposed, for example, an epoxy resin obtained by ring-opening polymerizing 4-vinyl-cyclohexane oxide and then epoxidizing the vinyl group (see, Patent Document 1 below), a resin produced by epoxidizing a compound obtained through alternating copolymerization of 4-vinyl-cyclohexane oxide and an acid anhydride (see, Patent Document 2 below), an epoxy resin composition obtained by polymerizing a methacrylic acid ester of epoxycyclohexanemethanol with another methacrylic or acrylic acid ester (see, Patent Document 3 below), and an epoxy resin composition obtained by polymerizing allyl 3,4-epoxycyclohexane-1-carboxylate with an allyl ester, a vinyl ester, a vinyl ether, a (meth)acrylic acid ester or the like (see, Patent Document 4 below). However, still higher performance is demanded in electrical characteristics, heat resistance and flexibility.

On the other hand, a thermosetting resin, such as unsaturated polyester resins and epoxy (meth)acrylate resins, is being widely used, for example, as a base material of FRP (fiber-reinforced plastic) for an electronic material, a building material, a transportation device, industrial equipment and materials and the like, or for a casting mold, a coating material, an adhesive, a resin concrete, a decorative sheet and the like.

The unsaturated polyester resin is a viscous liquid resin generally obtained by polycondensing an alcohol component composed of a polyhydric alcohol and an acid component composed of α,β-unsaturated polyvalent carboxylic acids and saturated polyvalent carboxylic acids or aromatic polyvalent carboxylic acids, and blending the resulting unsaturated polyester with a radical polymerizable monomer, such as styrene. By changing the kinds and amounts of the polyhydric alcohol as well as the acid component composed of α,β-unsaturated polyvalent carboxylic acids and saturated polyvalent carboxylic acids or aromatic polyvalent carboxylic acids used for the production of an unsaturated polyester, an unsaturated polyester resin composition having physical properties suitable for various intended uses or being moldable by a molding method suitable for the intended use can be produced.

An epoxy (meth)acrylate resin is derived from a polyhydric phenol-type epoxy resin, such as bisphenol-type epoxy resins and novolak-type epoxy resins, and (meth)acrylic acid, and is known as a resin with excellent moldability in view of curability, workability and the like, and usually, such a resin is also widely used by blending a radical polymerizable crosslinking agent, such as styrene.

However, this resin system contains approximately from 30 to 60 mass % of styrene, which is a radical polymerizable monomer. Thus, in an open-mold molding method, such as hand lay-up molding and spray-up molding, styrene contained in the resin often volatilizes during FRP shaping to worsen the molding working environment. In recent years, for example, the law of PRTR (Pollutant Release and Transfer Register) has been implemented, and regulations on discharge of chemical substances are tightened. Under such conditions, styrene contained in the resin above comes under a substance to be regulated. It is required of course in open-mold molding but also in other molding methods to reduce the amount of volatilized styrene so as to meet the regulations or to improve the molding working environment.

As for a method for reducing the content of a styrene monomer, there is a method of keeping low the molecular weight of a thermosetting resin, such as unsaturated polyester resins and epoxy acrylate resins, to lower the viscosity and thereby decrease the blending amount of the monomer (for example, decrease the amount of styrene).

In the case of an unsaturated polyester resin, the method for reducing the molecular weight generally includes a method of controlling the reaction to keep the molecular weight low, a method of capping the molecular terminal by modification with dicyclopentadiene to keep the molecular weight low (see, for example, Patent Documents 5 and 6 below), and a method of replacing a part of the polyhydric alcohol with a monoalcohol to cap the molecular terminal and thereby keep the molecular weight low (see, for example, Patent Document 7 below). In these methods, the absolute amount of styrene contained in the unsaturated polyester resin can be reduced to about 30 mass %, and therefore instability in the effect of suppressing styrene and decrease of the secondary adhesion, which are observed when utilizing a paraffin wax-based additive, do not occur, and therefore a stable effect of suppressing styrene can be obtained. Furthermore, since reduction in the viscosity can also be achieved by these methods, the molding workability, such as injection and filling in the RTM molding, can be improved and in the case of using the resin for a resin concrete, the amount of filler can be increased without impairing the moldability, such as fluidity and filling properties.

However, in the method of merely controlling the molecular weight, reduction in the molecular weight of the unsaturated polyester resin involves reduction in the mechanical properties of the resulting cured product, such as strength and elongation percentage, and moreover, the terminal group (hydroxyl group, carboxyl group) of the polyester increases, thereby resulting in the water resistance of the resulting cured product being greatly deteriorated.

In addition, in the case of a dicyclopentadiene-modified unsaturated polyester resin in which the molecular terminal is capped by using dicyclopentadiene so as to reduce the amount of a hydrophilic terminal group, the mechanical properties of the resulting cured product, such as strength and elongation percentage, are often impaired due to the chemical structure and decreased molecular weight of the dicyclopentadiene-modified unsaturated polyester resin.

RELATED ART

Patent Document

Patent Document 1: Kokai (Japanese Unexamined Patent Publication) No. 60-166675
Patent Document 2: Kokai No. 06-41275
Patent Document 3: Kokai No. 08-291214
Patent Document 4: Kokai No. 2007-204642
Patent Document 5: Kokai No. 54-159492
Patent Document 6: Kokai No. 53-092888
Patent Document 7: Kokai No. 52-003686

SUMMARY OF THE INVENTION

Problems to be Solved by the Invention

Each of the above-described conventional techniques has achieved results but is still insufficient in some aspects. For example, cyclohexene oxides having a low molecular weight are toxic on a worker's skin. In addition, both of the compounds represented by formulae (e) and (f) have low viscosity, and therefore a molding system for a solid epoxy resin, such as transfer molding, cannot be applied.

Furthermore, in Patent Documents 1 and 2, 4-vinyl-epoxycyclohexane is polymerized by ring-opening polymerizing the epoxy group thereof, and in the next step, formed into an epoxy resin by using a peracid, but it is difficult for the epoxidization after polymerization to convert all double bonds into an epoxy group industrially in a high yield. In Patent Document 3, it is difficult to control the molecular weight of the polymer by radical polymerization of an acrylic acid ester or methacrylic acid ester of epoxycyclohexane, and if the molecular weight becomes excessively large, this may cause a problem in the compatibility, solubility and the like.

In Patent Document 4, it is easy to control the molecular weight because of polymerization of an allyl group, but the copolymer with an acrylic acid ester or an allyl ester or vinyl ester is not necessarily sufficient in the electrical insulation.

Accordingly, an object of the present invention is to provide a novel epoxy-containing copolymer being excellent in the electrical insulation and having controllable physical properties, such as flexibility and adherence.

Taking into consideration the problems in the above-described conventional techniques related to a thermosetting resin, such as unsaturated polyester resins and epoxy (meth) acrylate resins, another object of the present invention is to provide an epoxy (meth)acrylate copolymer ensuring that curing by either light through irradiation of an active energy ray or heat is possible even without containing a low volatile monomer, such as styrene, and in addition to good balance between flexibility and toughness, properties, such as low dielectric characteristics, water resistance, heat resistance, chemical resistance, electrical insulation and good moldability, can be controlled, and a production process thereof.

Means to Solve the Problems

The present inventors have intensively studied the objects above and have performed a number of experiments, and as a result, they have succeeded in unexpectedly obtaining an epoxy group-containing polymer having high hydrophobicity and good electrical insulation, and a low halogen concentration by performing radical copolymerization of a base compound having an allyl group and/or a vinyl group in combination with an alicyclic epoxy group epoxidized through hydrogen peroxide oxidation or peracetic acid oxidation but not by a halohydrin method with a terminal olefin compound composed only of a hydrocarbon, and succeeded in obtaining a novel epoxy group-containing polymer having controllable physical properties, such as flexibility and adherence, required in usage, such as a solder resist of a flexible print board, by performing copolymerization with another compound containing an ethylenically unsaturated bond. The present invention has been accomplished based on these successes.

Furthermore, the present inventors have succeeded in obtaining an epoxy group-containing polymer having a low halogen concentration by performing radical copolymerization of a base compound having both an alicyclic epoxy group epoxidized through hydrogen peroxide oxidation or peracetic acid oxidation but not by a halohydrin method and an allyl group with a terminal olefin compound composed only of a hydrocarbon, and succeeded in obtaining a novel epoxy (meth)acrylate copolymer having controllable physical properties, such as flexibility and adherence, and being curable by either light through irradiation of an active energy ray or heat, which is useful in usage, such as a solder resist of a flexible print board, by reacting the epoxy group-containing copolymer above with (meth)acrylic acid. The present invention has been accomplished based on these successes.

In other words, the present invention relates to an epoxy-containing copolymer obtained, as described below, by radical copolymerization of a compound having an alicyclic epoxy group in combination with an allyl group and/or a vinyl group with a terminal olefin composed only of a hydrocarbon, and a production process thereof. Furthermore, the present invention relates to an epoxy (meth)acrylate copolymer obtained, as described below, by the reaction between an epoxy group-containing copolymer, which is obtained by radical copolymerization of a compound having both an alicyclic epoxy group and an allyl group with a terminal olefin composed only of a hydrocarbon, and (meth)acrylic acid, and a production process thereof.

Specifically, the present invention includes the following [1] to [17].

[1] An epoxy group-containing copolymer comprising at least one of repeating units represented by the following formulae (a), (b) and (c):

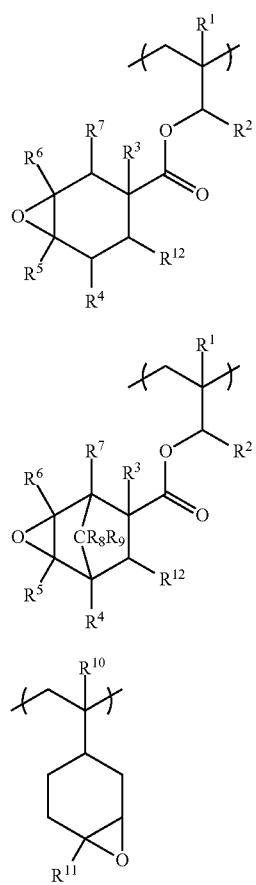

wherein each of $R^1$ to $R^{11}$ is a hydrogen atom or a methyl group, and $R^{12}$ is a hydrogen atom, a methyl group or a phenyl group, and a repeating unit represented by the following formula (d):

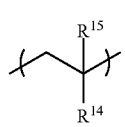

wherein $R^{14}$ is a hydrogen atom or a methyl group, and $R^{15}$ is a hydrogen atom or a saturated or unsaturated hydrocarbon group having a carbon number of 24 or less.

[2] The epoxy group-containing copolymer as described in [1] above, wherein the epoxy equivalent of the copolymer is from 190 to 3,000 g/eq.

[3] The epoxy group-containing copolymer as described in [1] or [2] above, wherein the number average molecular weight of the copolymer is from 400 to 10,000.

[4] The epoxy group-containing copolymer as described in any one of [1] to [3] above, wherein the total content of the repeating units represented by formulae (a), (b) and (c) in the copolymer is from 10 to 90 mol %, the content of the repeating unit represented by formula (d) is from 5 to 90 mol %, and the total of the total content of the repeating units represented by formulae (a), (b) and (c), and the content of the repeating unit represented by formula (d) is 100 mol % or less.

[5] The epoxy group-containing copolymer as described in any one of [1] to [4] above, wherein the repeating unit represented by formula (a) is at least one of repeating units represented by the following formulae (a1) to (a6) and the repeating unit represented by formula (c) is at least one of repeating units represented by the following formulae (c1) and (c2):

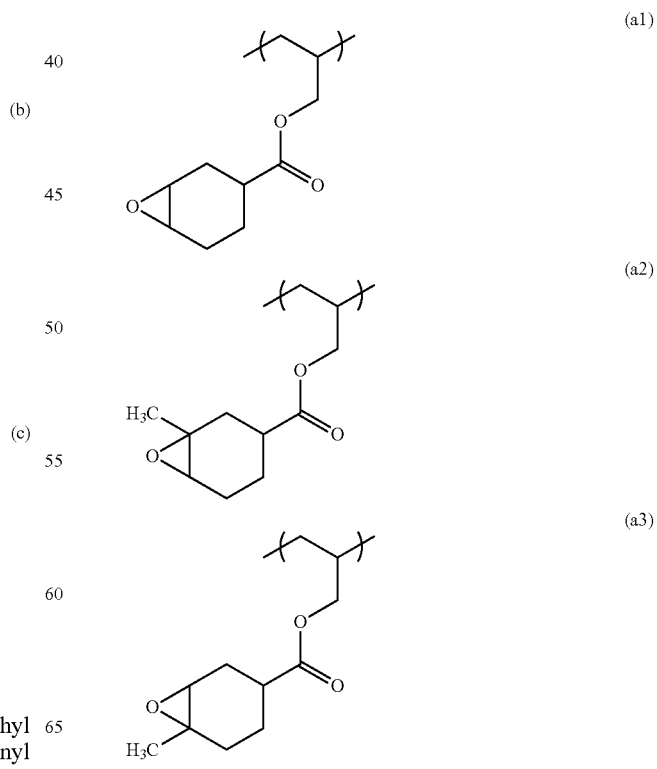

(a4)
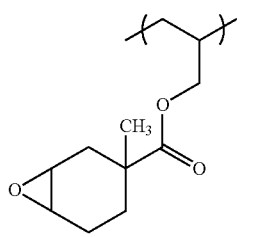

(a5)
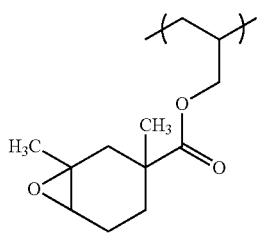

(a6)
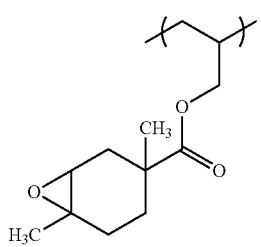

(c1)
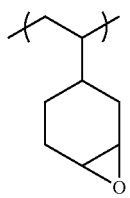

(c2)
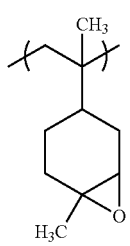

[6] The epoxy group-containing copolymer as described in any one of [1] to [5] above, wherein the repeating unit represented by formula (d) is derived from an ethylene and/or an unsaturated hydrocarbon having a carbon number of 8 or more.

[7] A process for producing the epoxy group-containing copolymer described in any one of [1] to [6] above, comprising radically-copolymerizing at least one of monomers containing an epoxy group and an allyl or vinyl group, represented by the following formulae (1), (2) and (3):

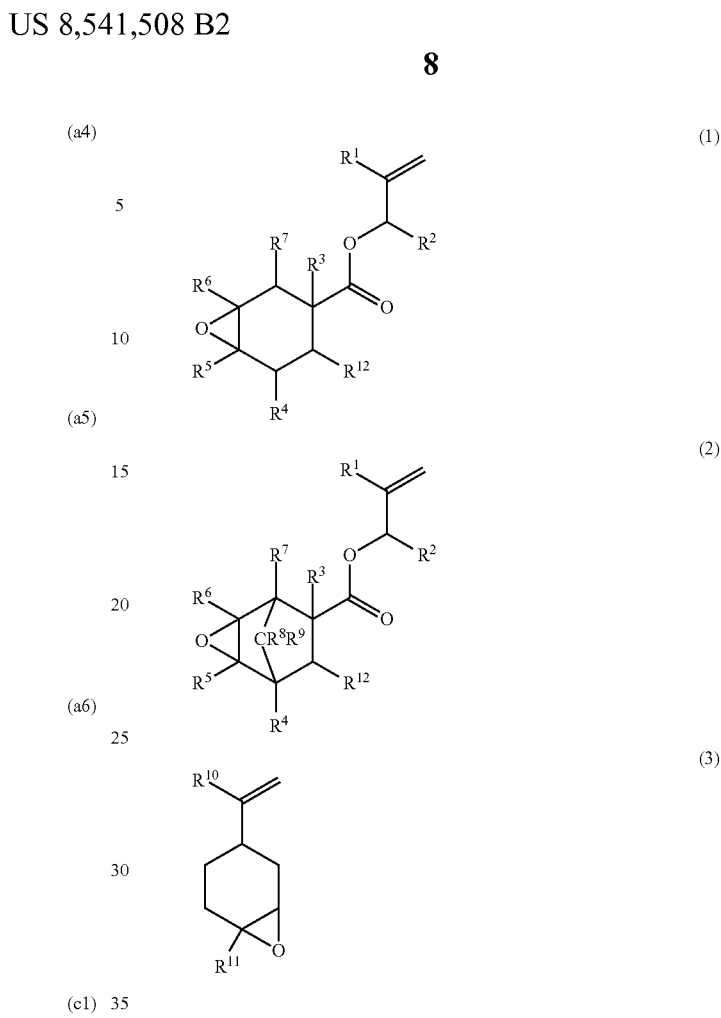

wherein each of $R^1$ to $R^{11}$ is a hydrogen atom or a methyl group, and $R^{12}$ is a hydrogen atom, a methyl group or a phenyl group, with an olefin represented by the following formula (4):

wherein $R^{14}$ is a hydrogen atom or a methyl group, and $R^{15}$ is a hydrogen atom or a saturated or unsaturated hydrocarbon group having a carbon number of 24 or less.

[8] A process for producing the epoxy group-containing copolymer described in any one of [1] to [6] above, comprising radically-copolymerizing at least one of monomers represented by the following formula (5):

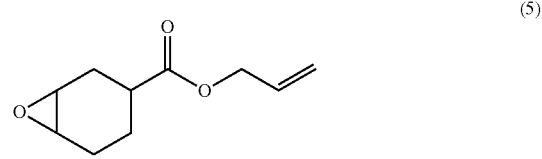

-continued

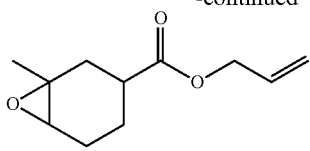
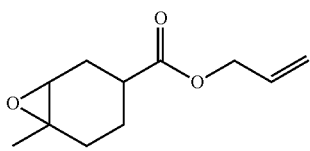
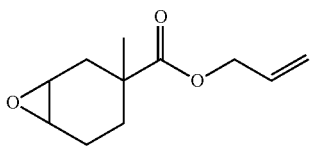
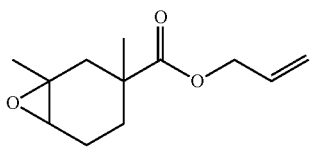
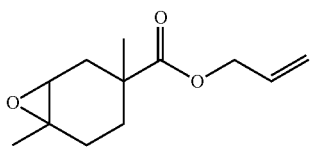
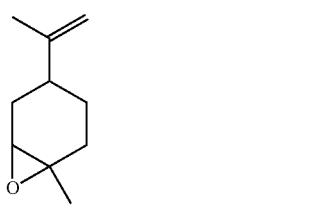

with at least one of ethylene, 4-methyl-1-pentene, 1-octene, 1-decene, 1-dodecene, 1-tetradecene, 1-hexadecene, 1-octadecene, 4-vinylcyclohexene and limonene.

[9] A process for producing the epoxy group-containing copolymer described in any one of [1] to [6] above, comprising radically-copolymerizing at least one of allyl 3,4-epoxycyclohexane-1-carboxylate, allyl 3,4-epoxy-1-methylcyclohexanecarboxylate and allyl 3,4-epoxy-6-phenylcyclohexanecarboxylate, with at least one of 4-methyl-1-pentene, 1-decene, 1-dodecene, 1-tetradecene, 1-hexadecene and 1-octadecene.

[10] The process for producing an epoxy group-containing copolymer as described in any one of [7] to [9] above, wherein low molecular components containing monomers are distilled off by using a thin-film evaporation apparatus or a molecular distillation apparatus after the copolymerization.

[11] An epoxy (meth)acrylate copolymer comprising at least one of repeating units represented by the following formulae (a1'), (a2'), (b1) and (b2):

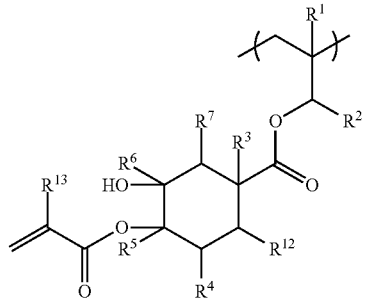
(a1')

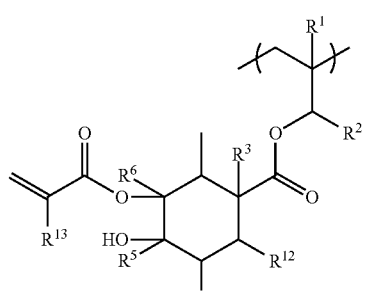
(a2')

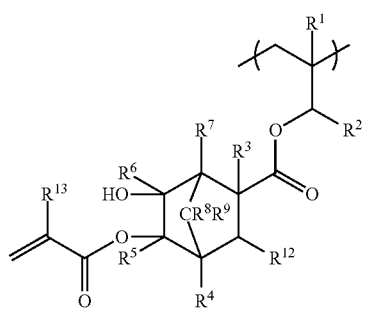
(b1)

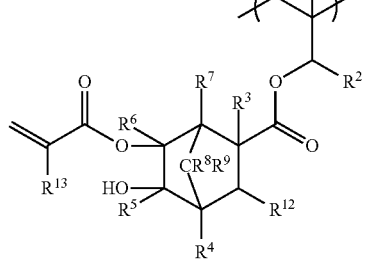
(b2)

wherein each of $R^1$ to $R^9$ and $R^{13}$ is a hydrogen atom or a methyl group, and $R^{12}$ is a hydrogen atom, a methyl group or a phenyl group, and a repeating unit represented by the following formula (d):

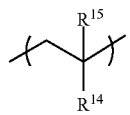
(d)

wherein $R^{14}$ is a hydrogen atom or a methyl group, and $R^{15}$ is a hydrogen atom or a saturated or unsaturated hydrocarbon group having a carbon number of 24 or less.

[12] The epoxy (meth)acrylate copolymer as described in [11] above, wherein the acryl equivalent of the copolymer is from 300 to 3,500 g/eq.

[13] The epoxy (meth)acrylate copolymer as described in [11] or [12] above, wherein the total content of the repeating units represented by formulae (a1'), (a2'), (b1) and (b2) in the copolymer is from 10 to 90 mol %, the content of the repeating unit represented by formula (d) is from 5 to 90 mol %, and the total of the total content of the repeating units represented by formulae (a1'), (a2'), (b1) and (b2), and the content of the repeating unit represented by formula (d) is 100 mol % or less.

[14] The epoxy (meth)acrylate copolymer as described in any one of [11] to [13] above, wherein the copolymer is obtained by reacting an epoxy group-containing copolymer containing at least one of repeating units represented by the following formulae (a) and (b):

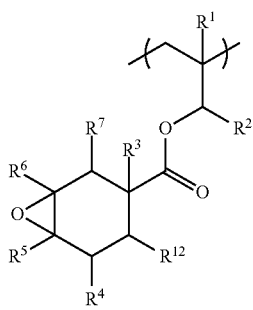

(a)

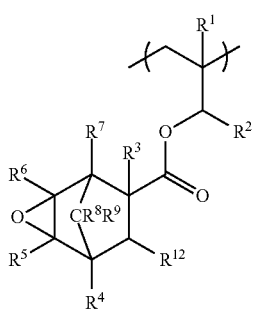

(b)

wherein each of $R^1$ to $R^9$ is a hydrogen atom or a methyl group, and $R^{12}$ is a hydrogen atom, a methyl group or a phenyl group and a repeating unit represented by formula (d), with (meth)acrylic acid.

[15] A process for producing the epoxy (meth)acrylate copolymer described in [14] above, comprising
a step of radically-copolymerizing at least one of monomers containing an epoxy group and an allyl group, represented by the following formula (1) and (2):

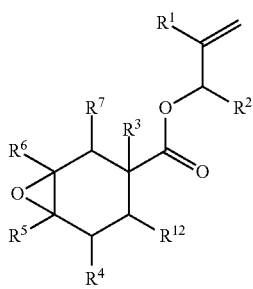

(1)

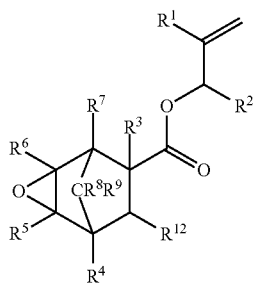

(2)

wherein each of $R^1$ to $R^9$ is a hydrogen atom or a methyl group, and $R^{12}$ is a hydrogen atom, a methyl group or a phenyl group, with an olefin represented by the following formula (4):

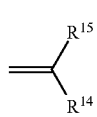

(4)

wherein $R^{14}$ is a hydrogen atom or a methyl group, and $R^{15}$ is a hydrogen atom or a saturated or unsaturated hydrocarbon group having a carbon number of 24 or less, to provide an epoxy group-containing copolymer containing at least one of repeating units represented by formulae (a) and (b), and a repeating unit represented by formula (d), and
a step of reacting (meth)acrylic acid with the epoxy group-containing copolymer.

[16] The process for producing an epoxy (meth)acrylate copolymer as described in [15] above, wherein the monomer containing an epoxy group and an allyl group is at least one of allyl 3,4-epoxycyclohexane-1-carboxylate, allyl 3,4-epoxy-1-methylcyclohexanecarboxylate and allyl 3,4-epoxy-6-phenylcyclohexanecarboxylate and the olefin is at least one of ethylene, 4-methyl-1-pentene, 1-hexene, 1-octene, 1-decene, 1-dodecene, 1-tetradecene, 1-hexadecene and 1-octadecene.

[17] The epoxy (meth)acrylate copolymer as described in [15] above, wherein the epoxy equivalent of the epoxy group-containing copolymer is from 190 to 3,000 g/eq.

Effects of the Invention

The present invention can provide a novel epoxy group-containing copolymer excellent in the electrical insulation, promising utilization in the fields of, for example, an electrical insulating material, such as a solder resist and an interlayer insulating film, an encapsulant of IC and VLSI, and a laminated sheet, and a production process thereof.

In addition, the epoxy (meth)acrylate copolymer of the present invention is curable by light or heat, and provides a cured product not only balanced between flexibility and toughness but also excellent in the low dielectric characteristics, adherence, water resistance, heat resistance, chemical resistance, electrical insulation and the like, and therefore can be applied to a wide range of fields including an electrical insulating material, such as a solder resist and an interlayer insulating film, an encapsulant of IC and VLSI, and a laminated sheet.

MODE FOR CARRYING OUT THE INVENTION

Figure 1:
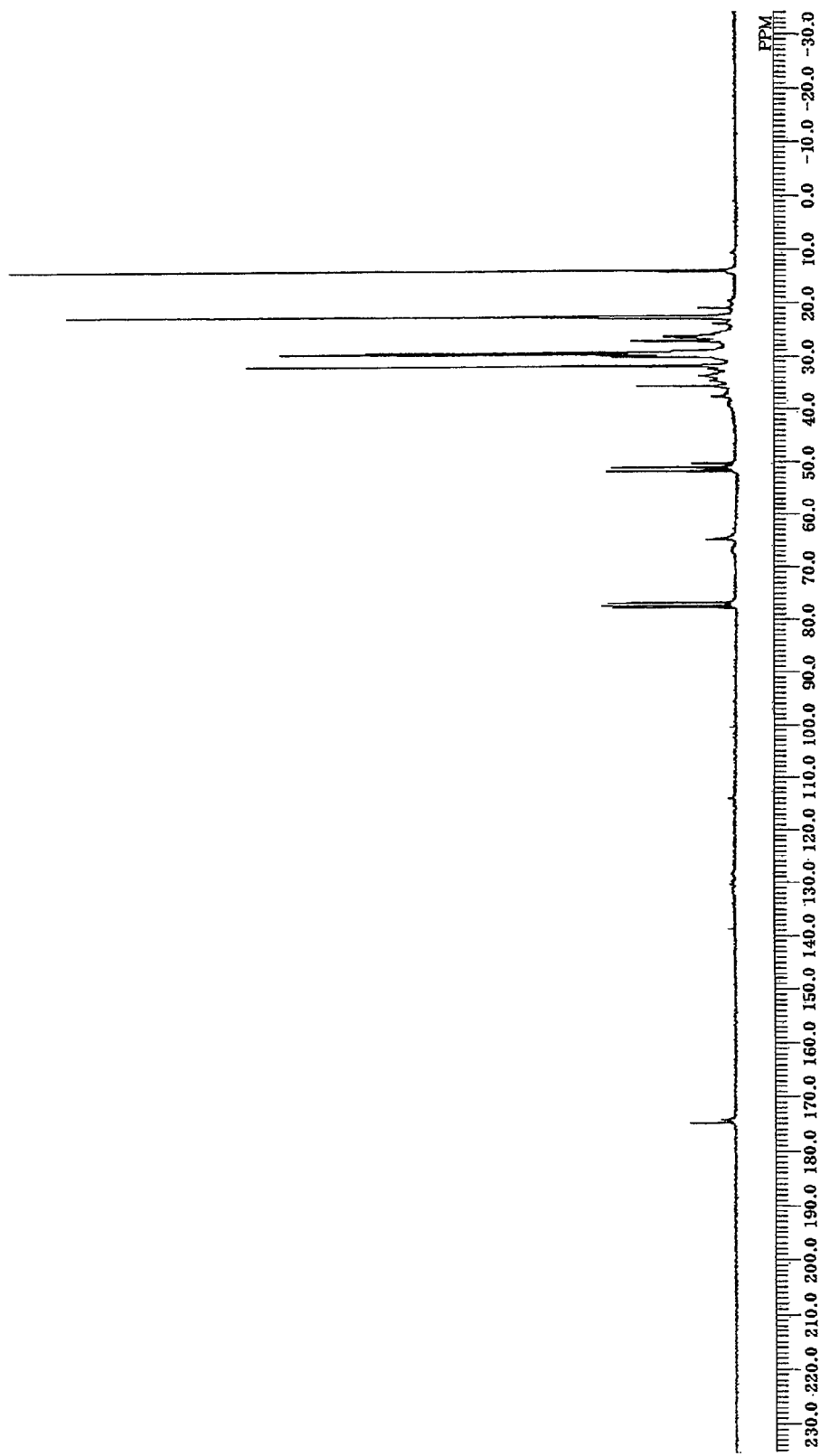
FIG. 1 A $^{13}$C-NMR spectrum of the oligomer obtained in Example 1.

The present invention is described in detail below.

The epoxy group-containing copolymer of the present invention comprises:

at least one of repeating units containing an alicyclic epoxy group, and an allyl group and/or a vinyl group, represented by the following formulae (a), (b) and (c):

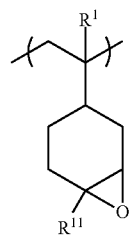

(a)

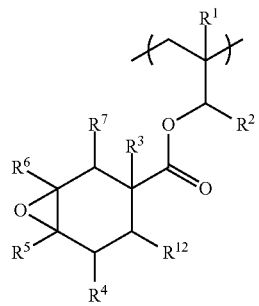

(b)

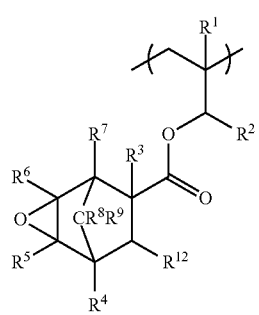

(c)

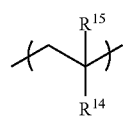

wherein each of $R^1$ to $R^{11}$ is a hydrogen atom or a methyl group, and $R^{12}$ is a hydrogen atom, a methyl group or a phenyl group, and a repeating unit represented by the following formula (d):

(d)

wherein $R^{14}$ is a hydrogen atom or a methyl group, and $R^{15}$ is a hydrogen atom or a saturated or unsaturated hydrocarbon group having a carbon number of 24 or less.

The repeating unit containing an alicyclic epoxy group, and an allyl group and/or a vinyl group is preferably at least one of the following repeating units:

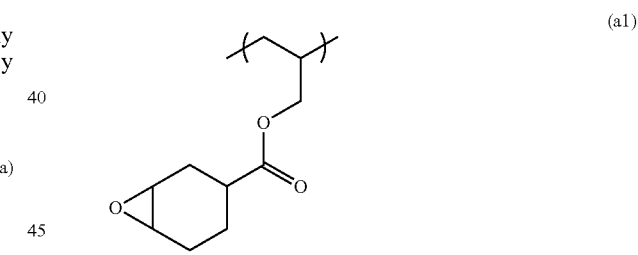

(a1)

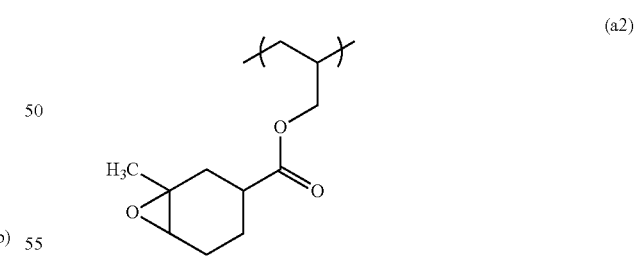

(a2)

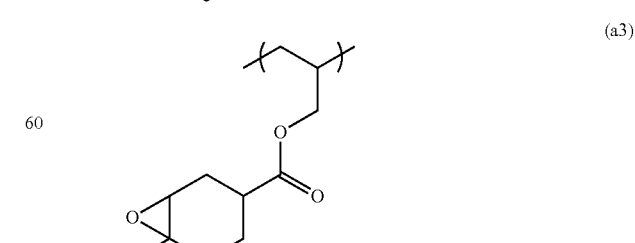

(a3)

(a4) 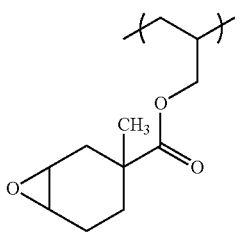

(a5) 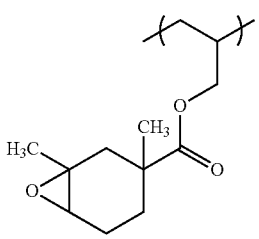

(a6) 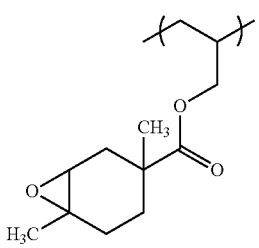

(c1) 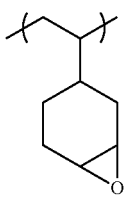

(c2) 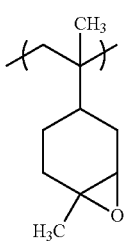

The repeating unit represented by formula (d) is preferably a repeating unit derived from an ethylene and/or an unsaturated hydrocarbon having a carbon number of 8 or more.

The copolymer comprising at least one of repeating units containing an alicyclic epoxy group, and an allyl group and/or a vinyl group, represented by the above formulae (a), (b) and (c), and at least one repeating unit represented by formula (d) is obtained by radically-copolymerizing at least one of monomers containing an epoxy group and an allyl or vinyl group, represented by the following formulae (1), (2) and (3):

(1) 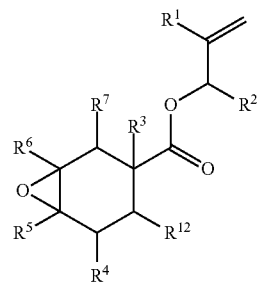

(2) 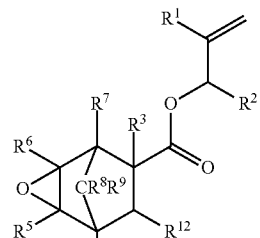

(3) 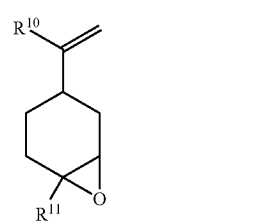

wherein each of $R^1$ to $R^{11}$ is a hydrogen atom or a methyl group, and $R^{12}$ is a hydrogen atom, a methyl group or a phenyl group, with an olefin having a terminal double bond, represented by the following formula (4):

(4) 

wherein $R^{14}$ is a hydrogen atom or a methyl group, and $R^{15}$ is a hydrogen atom or a saturated or unsaturated hydrocarbon group having a carbon number of 24 or less.

The epoxy (meth)acrylate copolymer of the present invention comprises at least one of repeating units represented by the following formulae (a1'), (a2'), (b1) and (b2):

(a1') 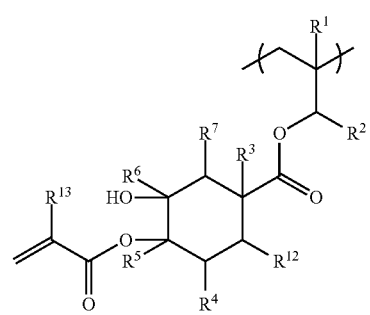

(a2′)
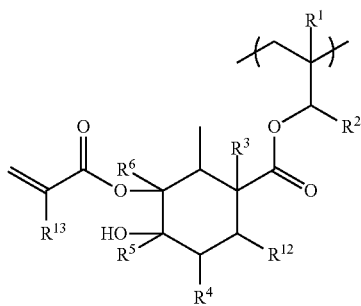

(b1)
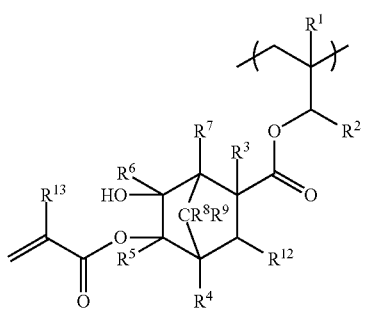

(b2)
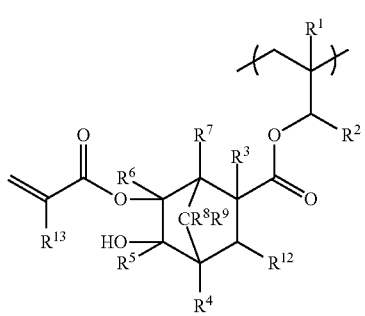

wherein each of $R^1$ to $R^9$ and $R^{13}$ is a hydrogen atom or a methyl group, and $R^{12}$ is a hydrogen atom, a methyl group or a phenyl group, and a repeating unit represented by the following formula (d):

(d)
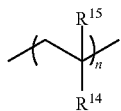

wherein $R^{14}$ is a hydrogen atom or a methyl group, and $R^{15}$ is a hydrogen atom or a saturated or unsaturated hydrocarbon group having a carbon number of 24 or less.

This epoxy (meth)acrylate copolymer can be produced by a process comprising a step of radically-copolymerizing at least one of monomers containing an epoxy group and an allyl group, represented by the following formulae (1) and (2):

(1)
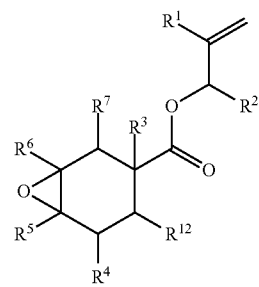

(2)
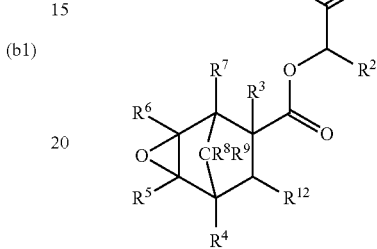

wherein each of $R^1$ to $R^9$ is a hydrogen atom or a methyl group, and $R^{12}$ is a hydrogen atom, a methyl group or a phenyl group, with an olefin represented by the following formula (4):

(4)
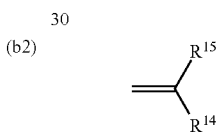

wherein $R^{14}$ is a hydrogen atom or a methyl group, and $R^{15}$ is a hydrogen atom or a saturated or unsaturated hydrocarbon group having a carbon number of 24 or less, to provide an epoxy group-containing copolymer containing at least one of repeating units represented by the following formulae (a) and (b):

(a)
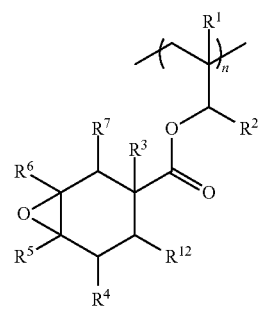

(b)
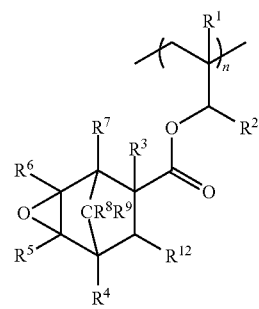

wherein each of $R^1$ to $R^9$ is a hydrogen atom or a methyl group, and $R^{12}$ is a hydrogen atom, a methyl group or a phenyl group and a repeating unit represented by formula (d), and a step of reacting (meth)acrylic acid with the epoxy group-containing copolymer.

In the specification of the present invention, the term "epoxy (meth)acrylate" indicates both an epoxy acrylate and an epoxy methacrylate. Similarly, the term "(meth)acrylic acid" indicates both methacrylic acid and acrylic acid.

In view of industrial use, the compound containing an alicyclic epoxy group and an allyl group, represented by formula (1) or (2), is preferably a monoepoxy compound obtained by using, as a precursor, a reaction product of butadiene or cyclopentadiene and (meth)acrylic acid, and after allyl esterification, performing a regioselective epoxidization reaction. Examples thereof include (meth)allyl 3,4-epoxycyclohexane-1-carboxylate, (meth)allyl 3,4-epoxy-1-methylcyclohexanecarboxylate, (meth)allyl 3,4-epoxy-6-methylcyclohexanecarboxylate, (meth)allyl 3,4-epoxy-6-phenylcyclohexanecarboxylate, (meth)allyl 5,6-epoxynorbornane-2-carboxylate, (meth)allyl 5,6-epoxy-2-methylnorbornane-2-carboxylate, (meth)allyl 5,6-epoxy-3-methylnorbornane-2-carboxylate, and (meth)allyl 5,6-epoxy-3-phenylnorbornane-2-carboxylate. More preferred examples include allyl 3,4-epoxycyclohexane-1-carboxylate, allyl 3,4-epoxy-1-methylcyclohexanecarboxylate, and allyl 3,4-epoxy-6-phenylcyclohexanecarboxylate. Although the synthesis method differs, other examples include a vinyl-cyclohexene oxide and a limonene monooxide containing an alicyclic epoxy group and a vinyl group represented by formula (3). Among these, at least one of monomers containing an epoxy group and an allyl or vinyl group, represented by the following formula (5):

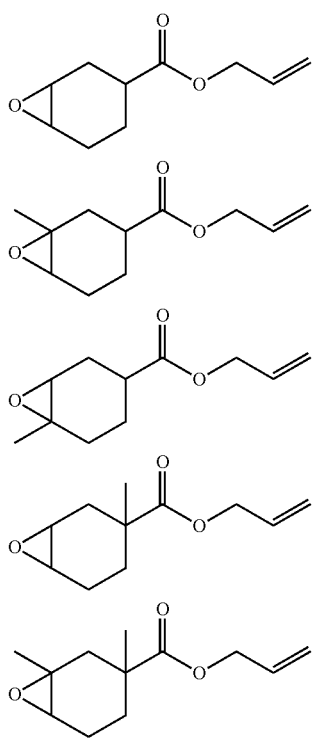

(5)

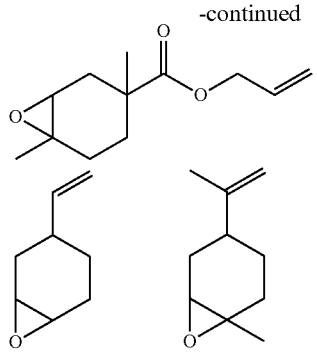

is preferred, and at least one of allyl 3,4-epoxycyclohexane-1-carboxylate and allyl 3,4-epoxy-1-methylcyclohexanecarboxylate is more preferred.

These compounds have an alicyclic epoxy group, and therefore have high storage stability as compared with a glycidyl-type epoxy compound, and their industrial use is facilitated. Furthermore, the alicyclic epoxy group is higher in the cationic polymerizability with a carboxyl group than a conventional glycidyl group. This is a very advantageous feature in the field of electronic material requiring curing at a lower temperature in a shorter amount of time.

Specific preferred examples of the olefin compound having a terminal double bond, represented by formula (4) include ethylene, propylene, isobutene, 1-butene, 3-methyl-1-butene, 1-pentene, 2-methyl-1-pentene, 4-methyl-1-pentene, 1-hexene, 1-heptene, 1-octene, 1-nonene, 1-decene, 1-dodecene, 1-tetradecene, 1-hexadecene, 1-octadecene, 4-vinylcyclohexene, 5-vinylnorbornene, limonene and allylbenzene. The more preferred compound is at least one of ethylene, 4-methyl-1-pentene, 1-octene, 1-decene, 1-dodecene, 1-tetradecene, 1-hexadecene, 1-octadecene, 4-vinylcyclohexene and limonene, more preferably at least one of 4-methyl-1-pentene, 1-decene, 1-dodecene, 1-tetradecene, 1-hexadecene and 1-octadecene.

The double bond of the epoxy compound is subjected to a radical reaction with the olefin compound having a terminal double bond composed only of a hydrocarbon, whereby a polyepoxy compound excellent in the moisture absorption resistance can be obtained.

Other copolymerizable monomers may also be used within the range not adversely affecting the physical properties of the copolymer (resin). Examples of such copolymerizable monomers include an allyl group-containing compound, such as allyl n-hexanoate, allyl cyclohexanecarboxylate, allyl cyclohexylpropionate, allyl benzoate, allyl phenylacetate, allyl phenoxyacetate, allyl trifluoroacetate, allyl methylcarbonate, allyl ethylcarbonate, allyl methyl ether, allyl glycidyl ether, allyl benzyl ether, allyloxytrimethylsilane, diallyl adipate, diallyl maleate, diallyl malonate, diallyl itaconate, 1,2-diallyloxyethane and diallyl phthalate; a vinyl ester, such as vinyl acetate, vinyl n-hexanoate, vinyl cyclohexanecarboxylate, vinyl pivalate, vinyl n-dodecanoate, vinyl benzoate, vinyl 4-tert-butylbenzoate, vinyl phenylacetate, N-vinyl phthalimide, vinyl cyclohexyl ether, vinyl trifluoroacetate, vinyltrimethylsilane, vinyltriphenoxysilane, divinyldimethylsilane, divinyloxyethane, divinyl diethylene glycol diether and 1,4-divinyloxybutane; an acrylic acid ester, such as methyl acrylate, ethyl acrylate, isopropyl acrylate, n-butyl acrylate, 2-ethylhexyl acrylate, cyclohexyl acrylate, lauryl acrylate, benzyl acrylate, phenoxyethyl acrylate, glycidyl acrylate, acrylonitrile, N-methylaminomethyl acrylate and N,N-dimethylaminoethyl acrylate; a methacrylic acid ester, such as methyl methacrylate, ethyl methacrylate, isopropyl methacrylate, n-butyl methacrylate, isobutyl methacrylate, n-hexyl methacrylate, cyclohexyl methacrylate, 2-ethylhexyl methacrylate, lauryl methacrylate, benzyl methacrylate, phenoxyethyl methacrylate, glycidyl methacrylate, methacrylonitrile, acrylamide, methacrylamide, aminomethyl methacrylate, N-methylaminomethyl methacrylate, N,N-dimethylaminomethyl methacrylate and 3,4-epoxycyclohexylmethyl methacrylate; a styrene-based monomer, such as styrene, vinyltoluene, α-methylstyrene, divinylbenzene and 4-vinylbiphenyl; and an N-substituted maleimide, such as N-cyclohexylmaleimide and N-phenylmaleimide. Such monomers can be suitably selected, and therefore various properties can be imparted to a resin containing them as a component.

The blending ratio of these components in the radical polymerization may be suitably determined according to the hydrophobic group, aromatic ring, functional group and the like intended to be included in the finally obtained epoxy resin composition, and the amount of the epoxy compound used may also be suitably determined depending on the content of the epoxy group intended to be included in the objective epoxy resin. It is preferable that the components are blended in such a ratio that the total content of the repeating units represented by formulae (a), (b) and (c) in the copolymer is from 10 to 90 mol %, the content of the repeating unit represented by formula (d) is from 5 to 90 mol %, and the total of the total content of the repeating units represented by formulae (a), (b) and (c) and the content of the repeating unit represented by formula (d) is 100 mass % or less. If the total is less than 100 mol %, the rest derives from other optional copolymerizable monomers used in combination, or a modified monomeric product having a skeleton in which the epoxy group in the repeating units represented by formulae (a), (b) and (c) has been ring-opened by water, an alcohol or a carboxylic acid mixed as an impurity or originated in an initiator during the polymerization.

The epoxy equivalent of the copolymer of the present invention is preferably from 190 to 3,000 g/eq., more preferably from 250 to 1,000 g/eq. If the epoxy equivalent is less than 190, the heat resistance, such as a glass transition temperature, may be higher but flexibility is impaired, whereas if it exceeds 3,000, the heat resistance lowers and due to reduction in the crosslinking density, properties, such as solvent resistance, are deteriorated. When the epoxy group-containing copolymer above is used, the acryl equivalent of an epoxy (meth)acrylate copolymer as a final product after the addition of (meth)acrylic acid would be from 300 to 3,500 q/eq. Incidentally, this acryl equivalent is a theoretical value when all epoxy groups are converted to an acryloyl group.

The radical polymerization can be carried out without a solvent. In the case of using a solvent, the solvent is not particularly limited as long as it dissolves the monomers and polymers, and the solvent is preferably inert to the epoxy group. Examples of the solvent that can be used include aromatic hydrocarbons, such as benzene, toluene and xylene; ketones, such as acetone, methyl ethyl ketone and methyl isobutyl ketone; ethers, such as diethyl ether, dibutyl ether, tert-butyl methyl ether and dioxane; esters, such as ethyl acetate, isobutyl acetate, ethylene glycol monoacetate, propylene glycol monoacetate, propylene glycol monomethyl ether acetate and dipropylene glycol monoacetate; lactones, such as γ-butyrolactone, δ-valerolactone and ∈-caprolactone; ethylene glycol monoalkyl ethers; diethylene glycol monoalkyl ethers; ethylene glycol dialkyl ethers; diethylene glycol dialkyl ethers, such as diethylene glycol dimethyl ether and diethylene glycol diethyl ether; ethylene glycol monoalkyl ether acetates; diethylene glycol monoalkyl ether acetates; halogenated hydrocarbons, such as carbon tetrachloride and chloroform; and alcohols, such as methanol, ethanol, 2-propanol and cyclohexanol. Depending on the conditions, for example, amides, such as dimethylformamide and dimethylacetamide, may also be used. These solvents may be used individually or as a mixture.

As for the polymerization initiator, a conventional radical polymerization initiator can be used, and for example, an azo type, such as 2,2'-azobisisobutyronitrile and 2,2'-azobis-(2,4-dimethylvaleronitrile), and a peroxide type, such as lauroyl peroxide, diisopropyl peroxydicarbonate, bis(4-tert-butylcyclohexyl) peroxydicarbonate, tert-butyl peroxy(2-ethylhexanoate), 1,1-di(tert-hexylperoxy)-3,3,5-trimethylcyclohexane, 1,1-di(tert-butylperoxy)cyclohexane, tert-butyl peroxyisopropylmonocarbonate, di-tert-butyl peroxide, di-tert-hexyl peroxide, dicumyl peroxide, methyl ethyl ketone peroxide, benzoyl peroxide, tert-butyl peroxybenzoate and cumene hydroperoxide, may be used individually or as a mixture. Among these, dialkyl peroxides and dialkyl peroxydicarbonates are preferred, in view of initiator efficiency and from the standpoint that the initiator residue is less likely to accelerate hydrolysis or acidolysis of the epoxy group. The polymerization initiator is preferably blended in an amount of 0.1 to 30 mol % based on the total mole number of monomers.

The reaction temperature varies depending on the kind of the polymerization initiator but may be suitably selected between −10° C. and 220° C., and in view of stability of the epoxy group and easy handleability, the reaction temperature is preferably from 10 to 160° C.

As for the reaction pressure, particularly in the case of reacting a compound which is gaseous at ordinary temperature, such as ethylene, a pressure needs to be applied, whereas in the case of using an olefin which is liquid at ordinary temperature, the reaction can be carried out under atmospheric pressure.

The molecular weight of the copolymer produced is determined depending on the reaction temperature, the adding rate of a monomer or polymerization initiator, the monomer concentration, the kind of monomer, and the like. The molecular weight of the epoxy group-containing copolymer after radical polymerization is preferably adjusted to from 400 to 8,000 in terms of the number average molecular weight. If the molecular weight is too high, workability decreases, whereas if it is excessively low, sufficient property cannot be obtained after curing. When epoxy (meth)acrylation is carried out using the epoxy group-containing copolymer above, the number average molecular weight would be approximately from 500 to 10,000.

Depending on the polymerization conditions, a diol derivative resulting from hydrolysis of the epoxy group, or particularly when using a perester, a glycol monoester derivative resulting from reaction of the epoxy group with an organic acid derived from the initiator may be by-produced. However, immixing of these derivatives sometimes enhances the mechanical strength, though the heat resistance may decrease, and this is not a problem as long as good overall properties are maintained.

The epoxy group-containing copolymer obtained as above can be designed to have various properties required of a solder resist, an interlayer insulating film and the like by changing the molecular weight and the kind of monomer introduced.

The reaction solution after radical polymerization may be directly used in certain applications. For example, in the case of using it for screen printing, polymerization is carried out in a high boiling point solvent, such as diethylene glycol monoethyl ether acetate and γ-butyrolactone, and after additives, such as silica, talc, a pigment, a defoaming agent and a leveling agent, are added directly to the reaction solution, the mixture may be kneaded by a dispersing machine, such as a three-roll mill, and then used.

The thus-obtained reaction solution containing an epoxy group-containing copolymer may be directly used in certain applications. However, since the olefin compound represented by formula (4) sometimes adversely affects the polymerization when curing the copolymer by polymerizing an acryloyl group after the addition of (meth)acrylic acid, the unreacted residual olefin compound is preferably removed by distillation or the like. In addition, since an epoxyallyl monomer or other coexisting low molecular compounds sometimes deteriorate the properties or increase the curing shrinkage percentage, it is a very effective technique to distill off residual monomers or low molecular weight oligomers by using a thin-film evaporation apparatus or a molecular distillation apparatus.

For use in solventless applications, the olefin-based residual monomer does not participate in the subsequent curing of epoxy. Therefore, such a monomer may be distilled off, if necessary, and after adding an initiator for epoxy directly to the polymerization solution and further adding any required additives, the resulting mixture may be shaped by casting polymerization or the like.

After the polymerization, since an epoxy-based monomer remains, it is an effective technique, particularly in the case of improving the shrinkage percentage or enhancing the mechanical properties, to distill off residual monomers or low molecular weight oligomers by using a thin-film evaporation apparatus or a molecular distillation apparatus.

The thin-film evaporation apparatus is an apparatus where a processing solution in a thin film form is evaporated under vacuum at a lower temperature without causing a thermal effect, and known examples thereof include a falling film-type thin-film evaporation apparatus, an agitated-type thin-film evaporation apparatus, and a centrifugal thin-film evaporation apparatus. The apparatus is generally operated under a pressure of 0.01 to 10 kPa at a temperature of 50 to 250° C.

The molecular evaporation apparatus is an apparatus where an extremely high vacuum is maintained, the liquid film on the evaporation surface is possibly thin so as to allow for very gentle evaporation from the evaporation surface, the distance between the evaporation surface and the condensation surface is not more than the mean free path of a molecule, and the molecule is prevented as much as possible from returning to the condensation surface by keeping a sufficiently large temperature difference between the evaporation surface and the condensation surface, and known examples thereof include a pot molecular distillation apparatus, a falling film-type molecular distillation apparatus, a centrifugal molecular distillation apparatus and an experimental centrifugal molecular distillation apparatus. The apparatus is generally operated under a pressure of 2 kPa or less, usually from 0.0001 to 1 kPa, at a temperature of 50 to 250° C., and even a molecule having a molecular weight of approximately 1,000 can be evaporated.

The epoxy group-containing copolymer obtained as above is quantitatively determined for the epoxy group concentration by measuring the epoxy equivalent and then reacted with (meth)acrylic acid, whereby the objective epoxy (meth)acrylate resin can be obtained. In this case, acrylic acid and methacrylic acid may be used individually or in combination.

This reaction is carried out by blending an unsaturated group-containing monocarboxylic acid in a ratio of 0.2 to 1.3 mol per mol of the epoxy group usually at 50 to 150° C. for 1 to 15 hours. Examples of a catalyst include amines, such as triethylamine, dimethylbutylamine and tri-n-butylamine; quaternary salts, such as tetramethylammonium salts, tetraethylammonium salts, tetrabutylammonium salts and benzyltriethyl ammonium salts; quaternary phosphonium salts; phosphines, such as triphenylphosphines; and imidazoles, such as 2-methylimidazole and 2-ethyl-4-methylimidazole.

In the reaction, a reaction solvent, for example, alcohols, such as methanol, ethanol, propanol, butanol, ethylene glycol, methyl cellosolve and ethyl cellosolve; esters, such as methyl cellosolve acetate and ethyl cellosolve acetate; a ketone-based solvent, such as methyl ethyl ketone and methyl isobutyl ketone; a lactone-based solvent, such as γ-butyrolactone; and aromatic compounds, such as benzene, toluene, chlorobenzene and dichlorobenzene, can be used. A polymerizable dilute monomer, such as styrene and methyl methacrylate, may also be used as a solvent.

In the reaction, a polymerization inhibitor, such as hydroquinone, methylhydroquinone, hydroquinone monomethyl ether, 4-methylquinoline, and phenothiazine, may be allowed to coexist in the reaction system. Furthermore, for inhibiting a polymerization reaction of an unsaturated bond, depending on the case, the reaction may be carried out under a flow of air or the like. In this case, an antioxidant, such as 2,6-di-tert-butyl-4-methylphenol, may be used in combination so as to prevent an oxidation reaction by air.

The reaction solution after epoxy (meth)acrylation may be directly used in certain applications. For example, in the case of using it for screen printing, polymerization is carried out in a high boiling point solvent, such as diethylene glycol monoethyl ether acetate and γ-butyrolactone, and after additives, such as silica, talc, a pigment, a defoaming agent and a leveling agent, are added directly to the reaction solution, the mixture may be kneaded by a dispersing machine, such as a three-roll mill, and then used.

Depending on the usage, the solvent may be distilled off, and the residue may be used as a solventless photocurable or thermosetting resin. In this case, the epoxy (meth)acrylate copolymer of the present invention may be used alone or in combination with another photosensitive (meth)acrylate compound, and after blending a photopolymerization initiator in the same manner as in the case of a conventional photosensitive (meth)acrylate compound, may be cured by irradiating an active energy ray.

Examples of the photosensitive (meth)acrylate compound include hydroxyl group-containing acrylates, such as 2-hydroxyethyl acrylate, 2-hydroxypropyl acrylate, pentaerythritol triacrylate and dipentaerythritol pentaacrylate; water-soluble acrylates, such as polyethylene glycol diacrylate and polypropylene glycol diacrylate; polyfunctional polyester acrylates of a polyfunctional alcohol, such as trimethylolpropane triacrylate, pentaerythritol tetraacrylate and dipentaerythritol hexaacrylate; acrylates of an ethylene oxide adduct or propylene oxide adduct of a polyfunctional alcohol, such as trimethylolpropane and hydrogenated bisphenol A, or a polyfunctional phenol, such as bisphenol A and biphenol; polyfunctional or monofunctional polyurethane acrylates by modifying the above-described hydroxyl group-containing acrylate with an isocyanate; epoxyacrylates by adding (meth) acrylic acid to bisphenol A diglycidyl ether, hydrogenated bisphenol A diglycidyl ether or phenol novolak epoxy resins; and methacrylates corresponding to the acrylates above. These may be used alone or in combination of two or more thereof.

Examples of the photopolymerization initiator include benzoin and benzoin alkyl ethers, such as benzoin, benzoin methyl ether, benzoin ethyl ether and benzoin isopropyl ether;

acetophenones, such as acetophenone, 2,2-dimethoxy-2-phenylacetophenone, 2,2-diethoxy-2-phenylacetophenone and 1,1-dichloroacetophenone; aminoacetophenones, such as 2-methyl-1-[4-(methylthio)phenyl]-2-morpholinoaminopropanone-1,2-benzyl-2-dimethylamino-1-(4-morpholinophenyl)-butane-1-one and N,N-dimethylaminoacetophenone; anthraquinones, such as 2-methylanthraquinone, 2-ethylanthraquinone, 2-tert-butylanthraquinone and 1-chloroanthraquinone; thioxanthones, such as 2,4-dimethylthioxanthone, 2,4-diethylthioxanthone, 2-chlorothioxanthone and 2,4-diisopropylthioxanthone; ketals, such as acetophenone dimethyl ketal and benzyl dimethyl ketal; organic peroxides, such as benzoyl peroxide and cumene peroxide; thiol compounds, such as 2,4,5-triarylimidazole dimer, riboflavin tetrabutyrate, 2-mercaptobenzimidazole, 2-mercaptobenzoxazole and 2-mercaptobenzothiazole; organic halogen compounds, such as 2,4,6-tris-s-triazine, 2,2,2-tribromoethanol and tribromomethylphenylsulfone; benzophenones or xanthones, such as benzophenone and 4,4'-bisdiethylaminobenzophenone; alkylphenones, such as 2,2-dimethoxy-1, 2-diphenylethan-1-one, 1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propan-1-one and 2-hydroxy-1-{4-[4-(2-hydroxy-2-methyl-propionyl)-benzyl]phenyl}-2-methyl-propan-1-one; and 2,4, 6-trimethylbenzoyldiphenylphosphine oxide.

These conventionally-known and commonly-used photopolymerization initiators may be used individually or as a mixture of two or more kinds thereof, and a photoinitiation aid, such as tertiary amines, e.g., ethyl N,N-dimethylaminobenzoate, isoamyl N,N-dimethylaminobenzoate, pentyl-4-dimethylaminobenzoate, triethylamine and triethanolamine, may be further added. A titanocene compound, such as CGI-784 (produced by Ciba Specialty Chemicals Inc.), having absorption in the visible light region may be added so as to accelerate a photoreaction. Particularly preferred examples of the photopolymerization initiator include 2-methyl-1-[4-(methylthio)phenyl]-2-morpholinoaminopropanone-1,2-benzyl-2-dimethylamino-1-(4-morpholinophenyl)-butan-1-one and 1-hydroxy-cyclohexyl-phenyl-ketone, but the present invention is not particularly limited thereto, and those capable of absorbing light in the ultraviolet or visible light region and radically-polymerizing an unsaturated group, such as a (meth)acryloyl group, may be used individually or in combination of a plurality of compounds, irrespective of a photopolymerization initiator or a photoinitiation aid.

In addition, the epoxy (meth)acrylate copolymer of the present invention may be used alone or in combination with another (meth)acrylate or styrene compound and cured by a heat polymerization method using an organic peroxide, an azo compound or the like, or by an ambient-temperature polymerization method using an organic peroxide and an accelerator.

Examples of the organic peroxide include tert-butyl peroxybenzoate, tert-butyl peroxy-2-ethylhexanoate, benzoyl peroxide, cyclohexanone peroxide, methyl ethyl ketone peroxide and bis-4-tert-butylcyclohexyl peroxydicarbonate, and examples of the azo compound include azobisisobutyronitrile, and such known compounds may be used individually or as a mixture of two or more kinds thereof. As for the accelerator, known accelerators, for example, salts of a polyvalent metal, such as octylic acid salts or naphthenic acid salts of cobalt, iron or manganese, and organic amines, such as dimethylaniline, diethylaniline, p-toluidine and ethanolamine, may be used individually or as a mixture of two or more kinds thereof.

As described above, the epoxy (meth)acrylate copolymer of the present invention alone or after blending with a photocurable component and/or a thermosetting component is cured by irradiating an active energy ray and/or heating, whereby a cured product thereof can be obtained. For example, an epoxy (meth)acrylate resin composition obtained by blending the epoxy (meth)acrylate copolymer of the present invention and a photopolymerization initiator, or further blending an epoxy resin and a curing agent, and optionally further blending a sensitizer, a curing accelerator and the like, can be easily formed into a cured product by the same method as a conventionally known method. Furthermore, for example, the epoxy (meth)acrylate copolymer of the present invention, a curing agent, a filler and other additives are thoroughly mixed, if necessary, using an extruder, a kneader, a roll or the like until the mixture becomes uniform, thereby providing an epoxy (meth)acrylate resin composition, and the epoxy (meth)acrylate resin composition is melted, then cast or molded using a transfer molding machine or the like, and further heated at 20 to 200° C., whereby a cured product can be obtained. A cured product can also be obtained by dissolving the epoxy resin composition in a solvent, impregnating a base material, such as glass fibers, carbon fibers, polyester fibers, polyamide fibers, alumina fibers and paper, with the solution, drying the impregnated substrate by heating, and subjecting the resulting prepreg to heat press molding or irradiation with an active energy ray. In the above-described epoxy (meth)acrylate resin composition, various compounding ingredients, such as an inorganic or organic filler, can be mixed, as desired.

Furthermore, the epoxy (meth)acrylate resin composition, in which the epoxy (meth)acrylate copolymer of the present invention, a photopolymerization initiator, a curing agent and an optional curing accelerator or the like are blended, may be dissolved in a solvent and thereby adjusted to a viscosity suitable for the coating method. Examples of such a solvent include ketones, such as methyl ethyl ketone and cyclohexanone; aromatic hydrocarbons, such as toluene, xylene and tetramethylbenzene; glycol ethers, such as cellosolve, methyl cellosolve, butyl cellosolve, carbitol, methyl carbitol, butyl carbitol, propylene glycol monomethyl ether, propylene glycol monoethyl ether, dipropylene glycol diethyl ether and triethylene glycol monoethyl ether; acetic acid esters, such as ethyl acetate, butyl acetate, cellosolve acetate, butyl cellosolve acetate, carbitol acetate, butyl carbitol acetate, propylene glycol monomethyl ether acetate and dipropylene glycol monomethyl ether acetate; alcohols, such as ethanol, propanol, ethylene glycol and propylene glycol; aliphatic hydrocarbons, such as octane and decane; petroleum solvents, such as petroleum ether, petroleum naphtha, hydrogenated petroleum naphtha and solvent naphtha. These organic solvent may be used individually or as a mixture of two or more kinds thereof. Incidentally, the blending amount of the organic solvent can be a desired amount according to the coating method.

Throughout the specification of the present invention, the epoxy equivalent of the epoxy group-containing copolymer is measured by the following method. In principle, hydrochloric acid and an epoxy group are reacted, the residual amount of hydrochloric acid is quantitatively determined by titration with an alkali, the amount of hydrochloric acid reacted is determined from the value obtained, and the amount of epoxy present in the resin is calculated based thereon. For this purpose, a sample prepared, such that the amount of the epoxy group is smaller than the amount of hydrochloric acid to be used and is from 2 to 4 mmol equivalent, is precisely weighed and put in a 200-ml stoppered conical flask, 25 mL of a 0.2 M hydrochloric acid-dioxane solution is added to this vessel by using a hole pipette and dissolved, and the solution is left standing at room temperature for 30 minutes. Subsequently, 10 ml of methyl cellosolve is added to wash the stopper and inner wall of the conical flask, from 4 to 6 drops of a 0.1% cresol red-ethanol solution as an indicator are added, and the mixture is thoroughly stirred until the sample becomes uniform. The sample is titrated with a 0.1 M potassium hydroxide-ethanol solution, and the point when the blue-violet color of the indicator continues for 30 seconds is taken as the end point of neutralization. A value obtained using the results in accordance to the following calculation formula is defined as the epoxy equivalent of the resin.

Epoxy equivalent (g/eq.)=(10000×$S$)/[($B$–$A$)×$f$]

S: Sampled amount (g) of sample

A: Used amount (ml) of 0.1 M potassium hydroxide-ethanol solution

B: Used amount (ml) of 0.1 M potassium hydroxide-ethanol solution in a blank test f: Factor of 0.1 M potassium hydroxide-ethanol solution In the measurement of the number average molecular weight Mn, gel permeation chromatography (hereinafter, simply referred to as "GPC") is used, and the molecular weight is determined by a value converted to polystyrene (standard sample used: STANDARD SM-105 produced by Showa Denko K.K.).

The measurement conditions of GPC are as follows.

Name of apparatus: HPLC Unit HSS-2000, manufactured by JASCO Corporation

Column: Shodex Column LF-804

Mobile phase: tetrahydrofuran

Flow rate: 1.0 mL/min

Detector: RI-2031 Plus, manufactured by JASCO Corporation

Temperature: 40.0° C.

Amount of sample: sample loop: 100μ liter

Concentration of sample: adjusted to around 0.1 mass %

EXAMPLES

The present invention is described in greater detail below by referring to Examples, but the present invention is not limited thereto.

Example 1

In a personal organic synthesis device, PPV-4060 (simple autoclave), manufactured by Tokyo Rikakikai Co., Ltd., 9.11 g (50 mmol) of allyl 3,4-epoxycyclohexane-1-carboxylate (hereinafter simply referred to as "CEA"), 36.6 g of 1-decene (LINEALENE-10, produced by Idemitsu Kosan Co., Ltd., purity: 96.6%, 250 mmol) and 2.238 g of di-tert-butyl peroxide (PERBUTYL-D, produced by NOF Corporation, purity: 98%, 15 mmol) were charged, followed by nitrogen purging. Thereafter, the reaction vessel was tightly closed, and the reaction was allowed to proceed at 144° C. for 3 hours. After the reaction, the residual monomer amount was measured by Gas Chromatography (GC) 6850 Series II manufactured by Agilent Technologies. As a result, 55.8% of allyl 3,4-epoxy-cyclohexane-1-carboxylate and 25.4% of 1-decene were reacted (copolymerization ratio: 1:2.28). The analysis of GPC revealed that the number average molecular weight was 1,230 and the weight average molecular weight was 1,980. CEA used herein as a raw material was produced by the production process described in Kokai No. 2006-316034.

Figure 2:
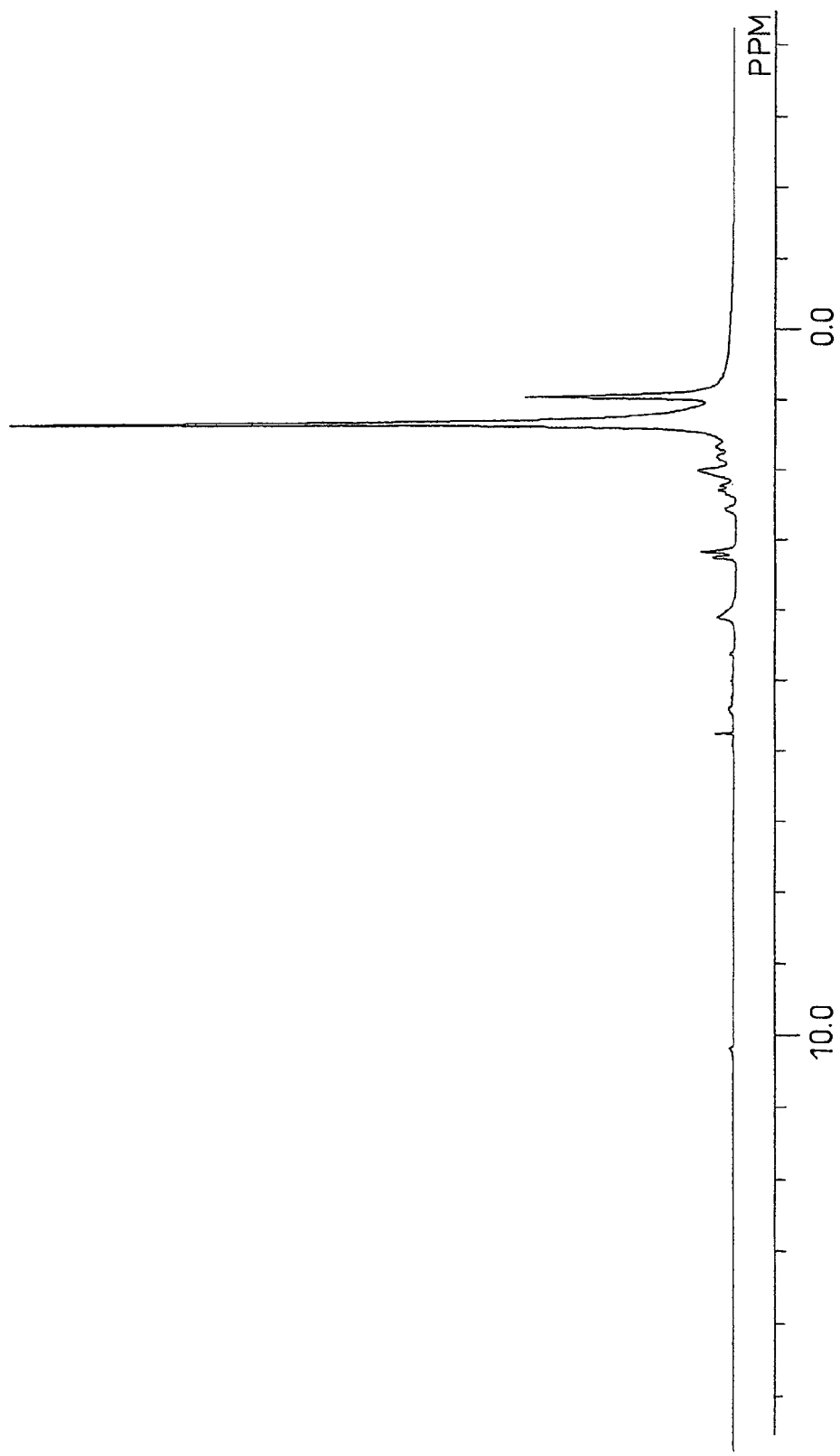
FIG. 2 A $^1$H-NMR spectrum of the oligomer obtained in Example 1.
Figure 3:
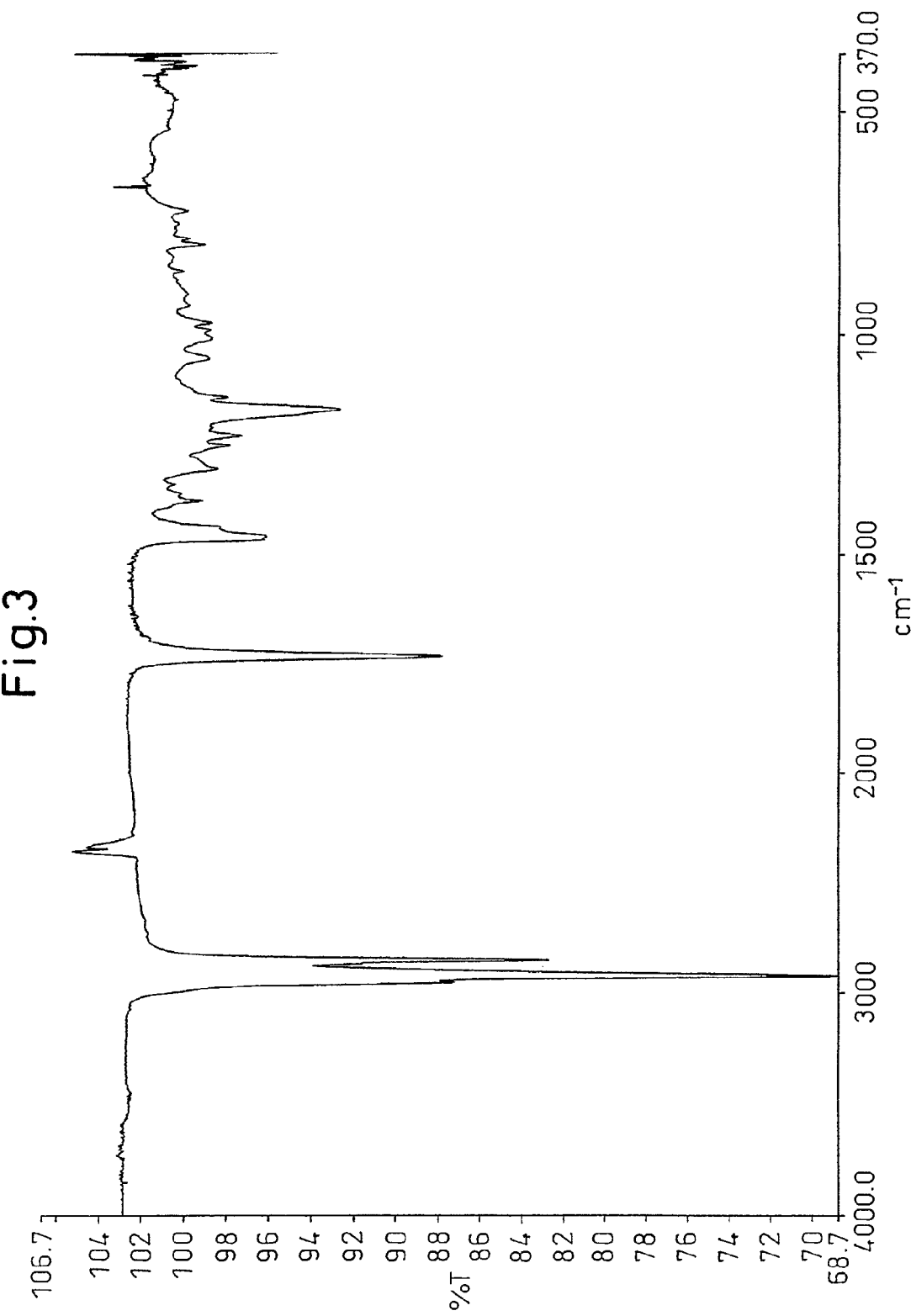
FIG. 3 An IR spectrum of the oligomer obtained in Example 1.

The same operation was repeated eight times, and the obtained polymerization solution was subjected to removal by distillation of monomers and a small amount of low molecular weight oligomers at a vacuum degree of 0.3 Pa and a column temperature of 110° C. by using a molecular distillation apparatus (MS-FL Special Model, manufactured by Taika Kogyo Co., Ltd.), whereby a viscous oligomer having an epoxy equivalent of 572.4 was obtained. The NMR (JNM EX-270, manufactured by JEOL Ltd.) spectrum of this oligomer is shown in FIG. 1 ($^{13}$C-NMR) and FIG. 2 ($^{1}$H-NMR), and the IR (Spectrum GX, manufactured by Perkin Elmer) spectrum is shown in FIG. 3.

As a result of $^{13}$C-NMR analysis, a distinct peak derived from the epoxy of epoxycyclohexane was observed in the vicinity of 50 (ppm) and the signal derived from the allyl-position carbon, which is observed at 64.330 (ppm) in the CEA monomer, was shifted to the low magnetic field side of 64.700 (ppm) in $^{13}$C-NMR of the product. From these results, this compound could be identified as an epoxy compound composed of a copolymer of CEA monomer and 1-decene monomer. In addition, as a result of IR analysis, absorption derived from the alicyclic epoxy and characteristic absorption derived from the ester carbonyl were observed at 1,172 cm$^{-1}$ and 1,732 cm$^{-1}$, respectively, whereas absorption at 1,438 cm$^{-1}$ derived from olefins of CEA monomer and 1-decene monomer was not observed. From these results, this compound could be identified as an epoxy compound having an alicyclic epoxy unit and an ester unit in the molecular structure and being composed of a copolymer of CEA monomer and 1-decene monomer.

Figure 4:
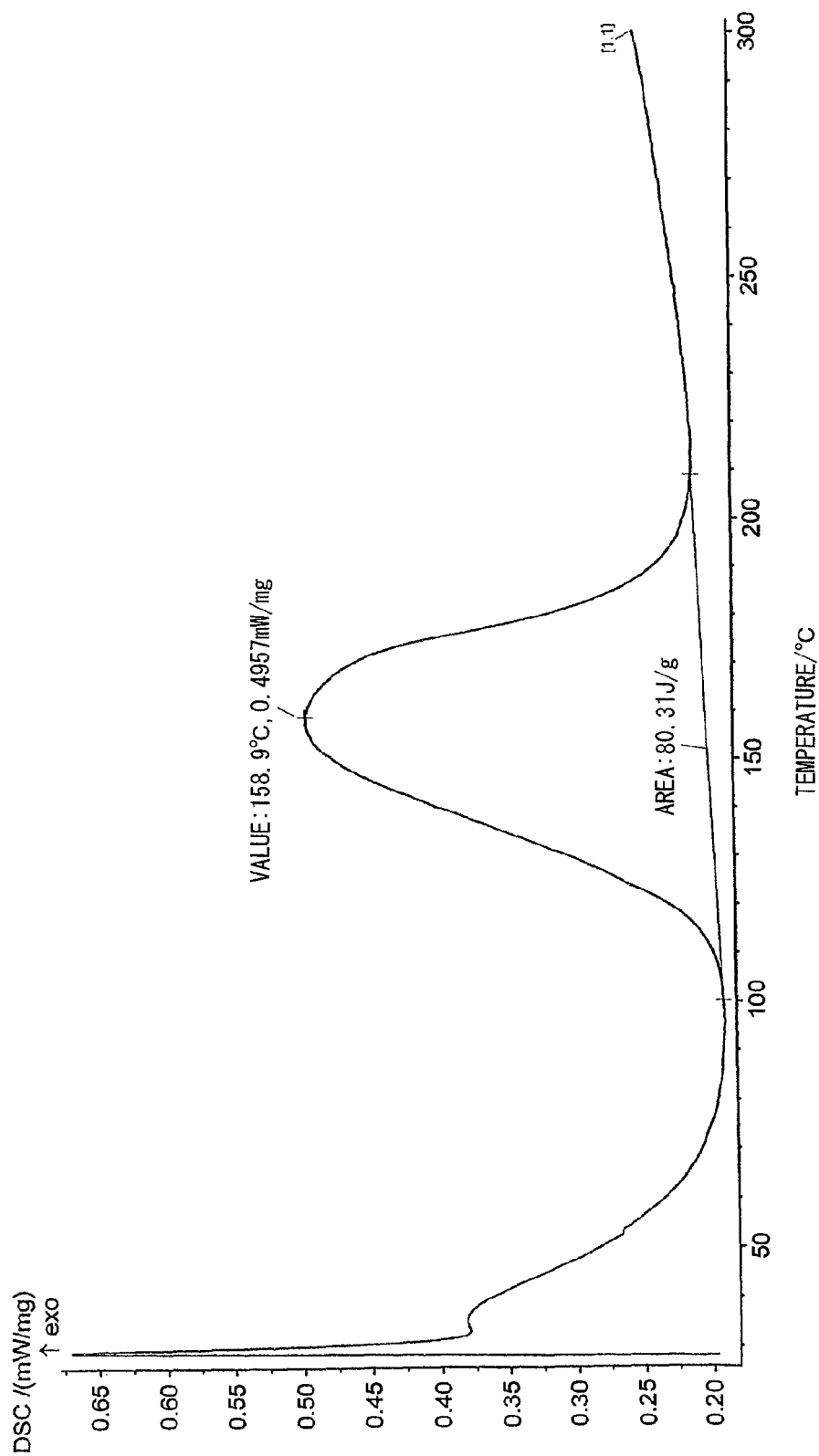
FIG. 4 A DSC chart of a mixture of the oligomer obtained in Example 1 and a cationic polymerization initiator.

Furthermore, SANAID SI-100 L (cationic epoxy curing agent, produced by Sanshin Chemical Industry Co., Ltd.) was added in an amount of 1 part by mass per 100 parts by mass of the oligomer, and DSC (204 F1, manufactured by NETZSCH) measurement was carried out. FIG. 4 shows the results (measurement range: from 50° C. to 350° C., ramp rate: 10° C./min). Since an exothermic peak is observed, it is understood that a thermosetting reaction occurred. In other words, cationic curability required as an alicyclic epoxy is maintained, and even though a long chain olefin has been copolymerized, a phenomenon that a curing reaction does not occur due to steric hindrance or the like is not brought about.

In addition, 2.67 g of anhydrous methylhexahydrophthalic acid (HN-5500E, produced by Hitachi Chemical Industries, Ltd.) and 0.127 g of tetra-substituted phosphonium bromide (Epoxy Curing Agent U-CAT 5003, produced by SAN-APRO Ltd.) were added to 10 g of the oligomer above and after thoroughly mixing, the mixture was sandwiched by glass plates with a 3-mm spacer therebetween and cured at 60° C. over 30 minutes, at 100° C. over 2 hours, and at 150° C. over 2 hours, to obtain a colorless transparent cured plate.

Examples 2 to 24

Using various epoxy group-containing monomers (first monomer) and olefins (second monomer), polymerization was carried out under the condition of a charge weight of about 50 g, which is similar to Example 1, by changing the polymerization conditions, and the obtained results including the results of Example 1 are shown in Table 1 below. It can be understood that copolymerization proceeded under any of those conditions.

TABLE 1

| | Charge to Reaction Vessel | | | | Polymerization Conditions | |
|---|---|---|---|---|---|---|
| | First | | Initiator | | | |
| Example | Monomer Kind | Second Monomer Kind | Kind | Mole Number | Preset Temperature | Reaction Time |
| 1 | CEA (produced by Showa Denko) | 1-decene (LINEALENE-10, produced by Idemitsu Kosan) | PERBUTYL-D (produced by NOF) | 5.0 mol % | 144 | 3 hr |
| 2 | CEA (produced by Showa Denko) | 1-dodecene (LINEALENE-12, produced by Idemitsu Kosan) | PERBUTYL-D (produced by NOF) | 5.0 mol % | 144 | 3 hr |
| 3 | CEA (produced by Showa Denko) | 1-tetradecene (LINEALENE-14, produced by Idemitsu Kosan) | PERBUTYL-D (produced by NOF) | 5.0 mol % | 144 | 3 hr |
| 4 | CEA (produced by Showa Denko) | 1-hexadecene (LINEALENE-16, produced by Idemitsu Kosan) | PERBUTYL-D (produced by NOF) | 5.0 mol % | 144 | 3 hr |
| 5 | CEA (produced by Showa Denko) | 1-octadecene (LINEALENE-18, produced by Idemitsu Kosan) | PERBUTYL-D (produced by NOF) | 6.25 mol % | 144 | 3 hr |
| 6 | CEA (produced by Showa Denko) | 1-hexene (LINEALENE-6, produced by Idemitsu Kosan) | PERBUTYL-D (produced by NOF) | 5.0 mol % | 144 | 3 hr |
| 7 | CEA (produced by Showa Denko) | 1-octene (LINEALENE-8, produced by Idemitsu Kosan) | PERBUTYL-D (produced by NOF) | 5.0 mol % | 144 | 3 hr |
| 8 | CEA (produced by Showa Denko) | 2-methyl-pentene-1 (produced by Tokyo Chemical) | PERBUTYL-D (produced by NOF) | 5.0 mol % | 144 | 3 hr |
| 9 | CEA (produced by Showa Denko) | 4-methyl-pentene-1 (produced by Tokyo Chemical) | PERBUTYL-D (produced by NOF) | 5.0 mol % | 144 | 3 hr |
| 10 | CEA (produced by Showa Denko) | limonene (produced by Ogawa & Co., Ltd.) | PERBUTYL-D (produced by NOF) | 5.0 mol % | 144 | 3 hr |
| 11 | CEA (produced by Showa Denko) | 4-vinyl-cyclohexene (produced by Tokyo Chemical) | PERBUTYL-D (produced by NOF) | 5.0 mol % | 144 | 3 hr |
| 12 | CEA (produced by Showa Denko) | 5-vinyl-norbornene (produced by Tokyo Chemical) | PERBUTYL-D (produced by NOF) | 5.0 mol % | 144 | 3 hr |
| 13 | limonene monooxide (produced by Showa Denko) | 1-dodecene (LINEALENE-12, produced by Idemitsu Kosan) | PERBUTYL-D (produced by NOF) | 5.0 mol % | 160 | 1 hr |
| 14 | vinylcyclohexene oxide (produced by Daicel Chemical) | 1-dodecene (LINEALENE-12, produced by Idemitsu Kosan) | PERBUTYL-D (produced by NOF) | 5.4 mol % | 144 | 3 hr |
| 15 | CEA (produced by Showa Denko) | 1-dodecene (LINEALENE-12, produced by Idemitsu Kosan) | PERBUTYL-D (produced by NOF) | 5.0 mol % | 144 | 3 hr |
| 16 | CEA (produced by Showa Denko) | 1-dodecene (LINEALENE-12, produced by Idemitsu Kosan) | PERBUTYL-D (produced by NOF) | 5.0 mol % | 144 | 3 hr |
| 17 | CEA (produced by Showa Denko) | 1-dodecene (LINEALENE-12, produced by Idemitsu Kosan) | PERBUTYL-D (produced by NOF) | 6.0 mol % | 144 | 3 hr |

TABLE 1-continued

| | | | | | | |
|---|---|---|---|---|---|---|
| 18 | CEA (produced by Showa Denko) | 1-dodecene (LINEALENE-12, produced by Idemitsu Kosan) | PERBUTYL-D (produced by NOF) | 3.0 mol % | 144 | 3 hr |
| 19 | CEA (produced by Showa Denko) | 1-dodecene (LINEALENE-12, produced by Idemitsu Kosan) | PERBUTYL-D (produced by NOF) | 7.0 mol % | 144 | 3 hr |
| 20 | CEA (produced by Showa Denko) | 1-dodecene (LINEALENE-12, produced by Idemitsu Kosan) | PERBUTYL-D (produced by NOF) | 5.0 mol % | 144 | 2 hr |
| 21 | CEA (produced by Showa Denko) | 1-dodecene (LINEALENE-12, produced by Idemitsu Kosan) | PERBUTYL-D (produced by NOF) | 5.0 mol % | 144 | 4 hr |
| 22 | CEA (produced by Showa Denko) | 1-dodecene (LINEALENE-12, produced by Idemitsu Kosan) | PERBUTYL-D (produced by NOF) | 5.0 mol % | 130 | 6 hr |
| 23 | CEA (produced by Showa Denko) | 1-dodecene (LINEALENE-12, produced by Idemitsu Kosan) | PERBUTYL-D (produced by NOF) | 5.0 mol % | 160 | 1 hr |
| 24 | CEA (produced by Showa Denko) | 1-dodecene (LINEALENE-12, produced by Idemitsu Kosan) | PERHEXA-TMH (produced by NOF) | 5.0 mol % | 106 | 3 hr |

| | GC Analysis Conversion Ratio | | Second/First Molar Ratio | | GPC | | |
|---|---|---|---|---|---|---|---|
| Example | First Monomer | Second Monomer | Charge | Reaction | $M_n$ | $M_w$ | $M_w/M_n$ |
| 1 | 55.8% | 25.4% | 5.00 | 2.28 | 1230 | 1978 | 1.61 |
| 2 | 53.8% | 21.1% | 5.00 | 1.96 | 1455 | 2218 | 1.52 |
| 3 | 58.2% | 26.1% | 5.00 | 2.24 | 1779 | 2716 | 1.53 |
| 4 | 35.9% | 4.9% | 5.00 | 0.69 | 1986 | 2793 | 1.41 |
| 5 | 43.7% | 5.8% | 5.00 | 0.66 | 2226 | 3087 | 1.39 |
| 6 | 30.2% | 16.2% | 5.00 | 2.68 | 820 | 1311 | 1.60 |
| 7 | 60.8% | 25.2% | 5.00 | 2.07 | 971 | 1601 | 1.65 |
| 8 | 36.0% | 39.1% | 5.00 | 5.44 | 621 | 859 | 1.38 |
| 9 | 60.5% | 36.6% | 5.00 | 3.03 | 894 | 1428 | 1.60 |
| 10 | 9.9% | 6.2% | 5.00 | 3.13 | 358 | 483 | 1.25 |
| 11 | 9.3% | 10.1% | 5.00 | 5.42 | 386 | 433 | 1.12 |
| 12 | 17.9% | 19.1% | 5.00 | 5.35 | 791 | 1313 | 1.66 |
| 13 | 21.3% | 25.8% | 5.00 | 6.06 | 1220 | 1714 | 1.40 |
| 14 | 9.0% | 12.5% | 5.00 | 6.35 | 1131 | 1586 | 1.40 |
| 15 | 57.4% | 26.8% | 2.00 | 0.93 | 1437 | 2254 | 1.57 |
| 16 | 66.4% | 31.9% | 4.00 | 1.92 | 1444 | 2335 | 1.62 |
| 17 | 45.3% | 18.3% | 6.00 | 2.42 | 1451 | 2274 | 1.57 |
| 18 | 35.2% | 13.9% | 5.00 | 1.97 | 1340 | 2382 | 1.78 |
| 19 | 63.4% | 30.1% | 5.00 | 2.37 | 1490 | 2422 | 1.63 |
| 20 | 48.3% | 19.4% | 5.00 | 2.01 | 1371 | 2139 | 1.56 |
| 21 | 54.4% | 23.3% | 5.00 | 2.14 | 1390 | 2234 | 1.61 |
| 22 | 33.6% | 11.2% | 5.00 | 1.67 | 1459 | 2182 | 1.50 |
| 23 | 60.4% | 27.9% | 5.00 | 2.31 | 1437 | 2164 | 1.51 |
| 24 | 37.7% | 9.6% | 5.00 | 1.28 | 871 | 1331 | 1.53 |

PERHEXA-TMH: 1,1-(di-tert-hexylperoxy)-3,3,5-trimethylcyclohexane

[Evaluation as Thermosetting Composition for Overcoat]

<Preparation of Thermosetting Resin Composition>

Example 25

Out of the components shown below, components except for the fluorine-containing surfactant and the leveling agent were blended with the copolymer obtained in Example 1, and the mixture was kneaded using a three-roll mill. After kneading by a three-roll mill, the surfactant and the leveling agent were added thereto and mixed by a resin mixer to prepare a thermosetting resin composition.

| | |
|---|---|
| Copolymer of Example 1 | 28.6 parts by mass |
| Acid anhydride: HN-5500E (produced by Hitachi Chemical Industries, Ltd.) | 8.4 parts by mass |
| Curing agent: 2E4MZ (produced by Shikoku Chemicals Corp.) | 0.37 parts by mass |
| Thixotropic agent: Aerosil R974 (produced by Nippon Aerosil Co., Ltd.) | 1.85 parts by mass |
| Barium sulfate: B94 (produced by Sakai Chemical Industry Co., Ltd.) | 7.4 parts by mass |

-continued

| | |
|---|---|
| Silicone powder: X-52-854 (produced by Shin-Etsu Chemical Co., Ltd.) | 1.85 parts by mass |
| Fluorine-containing surfactant: PolyFOX PF6520 (produced by OMNOVA) | 0.11 parts by mass |
| Leveling agent: DISPARLON 230 HF (produced by Kusumoto Chemicals, Ltd.) | 0.56 parts by mass |

<Evaluation of Cured Product>
[Long-Term Reliability of Electrical Insulation]

A commercially available substrate (IPC standard) IPC-C (100 μm-pitch comb-type pattern, line/space=50 μm/50 μm) was used as a base material, and the thermosetting resin composition above was printed on the base material under the conditions of a screen plate of ST250-30, a printing speed of 100 mm/sec, a clearance between printing plate and base material of 2.0 mm, a squeegee hardness of 80° and a squeegee angle of 70°, then dried at 80° C. for 30 minutes and further thermally cured at 150° C. for 1 hour. This substrate was left standing for a predetermined time in a high-temperature high-humidity atmosphere (85° C., relative humidity: 85%) while applying a bias voltage of 100 V and evaluated for the insulation resistance value and the presence or absence of migration.

The insulation resistance value before the treatment in a high-temperature high-humidity atmosphere was $10^{10} \Omega$ or more and even after 200 hours of the treatment in a high-temperature high-humidity atmosphere, the insulation resistance value was kept at $10^{10} \Omega$. In addition, migration was not recognized even after 200 hours of the treatment in a high-temperature high-humidity atmosphere. In the present invention, a copolymer based on a compound having an alicyclic epoxy group epoxidized through hydrogen peroxide oxidation or peracetic acid oxidation but not by a halohydrin method is used, and therefore the electrical insulation of the cured plate obtained was good. It can be expected that by copolymerizing a monomer containing an epoxy group and an allyl or vinyl group with a long-chain α-olefin, a soft cured product with high hydrophobicity, which derives from a liquid before curing, is obtained after curing.

Example 26

In a 1 L-volume four-neck flask equipped with a thermometer, an oil bath and a reflux condenser tube, 300.0 (g) of CEA (produced by Showa Denko K.K., 1.65 mol) and 277.1 (g) of 1-dodecene (produced by Idemitsu Kosan Co., Ltd., 1.65 mol) were charged and mixed with stirring under nitrogen atmosphere. The oil bath was heated while continuing the stirring and the internal temperature was set to 160° C. Thereto, 24.6 (g) of di-tert-butyl peroxide (produced by NOF Corporation) was added dropwise over 1 hour by a dropping funnel, and the mixture was ripened for 2 hours. After the reaction, the residual monomer amount was measured by Gas Chromatography 6850GC Series II manufactured by Agilent Technologies. As a result, 85.8% of CEA and 57.6% of 1-decene were reacted (copolymerization ratio: 1:0.67).

The same operation was repeated twice, and the obtained polymerization solution was subjected to removal by distillation of monomers and a small amount of low molecular weight oligomers at a vacuum degree of 0.3 Pa and a column temperature of 110° C. by using a molecular distillation apparatus (MS-FL Special Model, manufactured by Taika Kogyo Co., Ltd.), whereby a viscous oligomer having an epoxy equivalent of 323.3 was obtained.

In addition, 318.18 (g) of anhydrous methylhexahydrophthalic acid (HN-5500E, produced by Hitachi Chemical Industries, Ltd.) and 9.92 (g) of 2-ethyl-4-methylimidazole (produced by Shikoku Chemicals Corp.) were added to 673.5 (g) of the oligomer above and after mixing, the mixture was vacuum defoamed to prepare Curing Solution a. SUS molds sandwiching a spacer having a predetermined thickness were heated at 60° C., and Curing Solution a was poured thereinto and cured at 80° C. over 1 hour, at 120° C. over 2 hours, and at 150° C. over 2 hours, to obtain a colorless transparent cured plate. The cured plates obtained were 4 square plates of 220 mm×220 mm×3 mm and 12 block plates of 100 mm×10 mm×4 mm.

A JIS K7113 No. 1 test specimen was prepared from the cured plate obtained above and subjected to a tensile test (strength, elongation) by the method in accordance with JIS K7113 using STROGRAPH TD manufactured by Toyo Seiki Seisaku-Sho, Ltd., under the conditions of a test speed of 5 mm/min, a marker-to-marker distance of 50 mm, a chuck-to-chuck distance of 115 mm, a test temperature of 23° C. and a test number of n=5. The results are shown in Table 2 below.

In addition, a test specimen of 100 mm×100 mm×3 mm was prepared from the cured plate obtained above, left standing in an environment of 23±2° C. and 50±5% RH for 48 hours for conditioning, and then subjected to an insulation resistance test by the method in accordance with JIS K6911: 1995 using a digital ultrahigh resistance/micro current ammeter, R8340A, manufactured by Advantest Corporation (main electrode: 50 mm in diameter, inner diameter/outer diameter of guard electrode=70 mm/80 mm) under the conditions of an applied voltage of 500 (V), an applying time of 1 minute, a test temperature of 23° C. and a test number of n=3. The results are shown in Table 2 below.

Furthermore, a test specimen of 100 mm×100 mm×3 mm was prepared from the cured plate obtained above and subjected to an arc resistance test by the method in accordance with ASTM D495 using an arc resistance tester, Model YST-1621, manufactured by Yamayo Measuring Tools Co., Ltd., under the conditions of a test temperature of 23° C. and a test number of n=3. The results are shown in Table 2 below.

In addition, a test specimen of 100 mm×100 mm×3 mm was prepared from the cured plate obtained above and measured for the water absorption ratio by the method in accordance with JIS K7209 Method A under the condition of a test number of n=3. In particular, the test specimen was dried in a drier at 50° C. for 24 hours and then allowed to cool in a desiccator, and the initial weight (M1) was measured by an electronic balance. Thereafter, the test specimen was immersed in distilled water for 24 hours and taken out, and after wiping off the water on the sample surface with a filter paper, the weight (M2) after water absorption was measured. The water absorption ratio was calculated by introducing the measured weights into the following formula:

Water absorption ratio (%)={(M2−M1)/M1}×100

The results are shown in Table 2 below.

Comparative Example 1

139 Parts by weight of Celloxide 2021P (produced by Daicel Chemical Industries, Ltd.), 164 parts by weight of anhydrous methylhexahydrophthalic acid (HN-5500E, produced by Hitachi Chemical Industries, Ltd.) and 6.06 parts by weight of 2-ethyl-4-methylimidazole (produced by Shikoku Chemicals Corp.) were mixed, and the mixture was vacuum defoamed to prepare Curing Solution b. Similarly to Example 26, Curing Solution b was poured into molds heated at 100° C., and then cured at 100° C. over 1 hour, at 120° C. over 6 hours, at 150° C. over 1 hour, and at 180° C. over 1 hour.

The specimens similar to those in Example 26 were prepared from the cured plate obtained above and subjected to a tensile test (strength, elongation), an insulation resistance test, an arc resistance test and measurement of a water absorption ratio. The results are shown together in Table 2 below.

TABLE 2

|  | Tensile Test | | Insulation Resistance Test | | Arc | Water Absorption |
|---|---|---|---|---|---|---|
|  | Strength MPa | Elongation % | Surface Resistance Ω | Volume Resistance Ω/cm | Resistance Test sec | Ratio % |
| Example 26 | 40.2 | 4.0 | $1.2 \times 10^{17}$ | $2.4 \times 10^{16}$ | 125 | 0.18 |
| Comparative Example 1 | 40.0 | 1.6 | $1.4 \times 10^{16}$ | $5.4 \times 10^{15}$ | 110 | 0.60 |

It can be understood that the epoxy resin obtained in the present invention as above is enhanced in the flexibility, insulation resistance and arc resistance, as compared with the conventional alicyclic epoxy compound, and further has a low water absorption ratio.

Synthesis Example 1

In a personal organic synthesis device, PPV-4060 (simple autoclave), manufactured by Tokyo Rikakikai Co., Ltd., 21.9 g (120 mmol) of allyl 3,4-epoxycyclohexane-1-carboxylate (hereinafter simply referred to as "CEA", produced by Showa Denko K.K.), 34.25 g of 1-octene (LINEALENE-8, produced by Idemitsu Kosan Co., Ltd., purity: 98.3%, 300 mmol) and 3.13 g of di-tert-butyl peroxide (PERBUTYL-D, produced by NOF Corporation, purity: 98%, 21 mmol) were charged, followed by nitrogen purging. Thereafter, the reaction vessel was tightly closed, and the reaction was allowed to proceed at 160° C. for 3 hours. After the reaction, the residual monomer amount was measured by Gas Chromatography (GC) 6850 Series II manufactured by Agilent Technologies. As a result, 75.3% of CEA and 37.3% of 1-octene were reacted (copolymerization ratio: CEA/1-octene=1/1.24).

The same experiment was repeated four times, and the obtained polymerization solution was subjected to removal by distillation of monomers at a vacuum degree of 20 hPa and a water temperature of 25 to 60° C. by using a rotary evaporator, N-1000, manufactured by Tokyo Rikakikai Co., Ltd. Furthermore, residual monomers and a small amount of low molecular weight oligomers were distilled off at a vacuum degree of 0.3 Pa and a column temperature of 100° C. by using a molecular distillation apparatus, MS-FL Special Model, manufactured by Taika Kogyo Co., Ltd., to obtain a viscous oligomer having an epoxy equivalent of 388.6. The analysis of GPC revealed that the number average molecular weight was 1,200 and the weight average molecular weight was 1,980. CEA used herein as a raw material was produced by the production process described in Kokai No. 2006-316034.

Synthesis Example 2

In a personal organic synthesis device, PPV-4060 (simple autoclave), manufactured by Tokyo Rikakikai Co., Ltd., 25.5 g of CEA (produced by Showa Denko K.K., 140 mmol), 42.55 g of 4-methyl-1-pentene (4 MP-1, produced by Mitsui Chemicals, Inc., purity: 98%, 300 mmol) and 3.66 g of di-tert-butyl peroxide (PERBUTYL-D, produced by NOF Corporation, purity: 98%, 24.5 mmol) were charged, followed by nitrogen purging. Thereafter, the reaction vessel was tightly closed, and the reaction was allowed to proceed at 160° C. for 3 hours. After the reaction, the residual monomer amount was measured by Gas Chromatography (GC) 6850 Series II manufactured by Agilent Technologies. As a result, 76.6% of CEA and 46.7% of 4-methyl-1-pentene were reacted (copolymerization ratio: CEA/4-methyl-1-pentene=1/1.52).

The same experiment was repeated four times, and the obtained polymerization solution was subjected to removal by distillation of monomers at a vacuum degree of 20 hPa and a water temperature of 25 to 60° C. by using a rotary evaporator, N-1000, manufactured by Tokyo Rikakikai Co., Ltd. Furthermore, residual monomers and a small amount of low molecular weight oligomers were distilled off at a vacuum degree of 0.3 Pa and a column temperature of 120° C. by using a molecular distillation apparatus, MS-FL Special Model, manufactured by Taika Kogyo Co., Ltd., to obtain a viscous oligomer having an epoxy equivalent of 320.8. The analysis of GPC revealed that the number average molecular weight was 1,100 and the weight average molecular weight was 1,760.

Synthesis Example 3

In a 1 L-volume four-neck flask equipped with a reflux tube, a thermometer and a ball cock, 167.6 g of CEA (produced by Showa Denko K.K., 0.92 mol), 405.8 g of 1-dodecene (LINEALENE-12, produced by Idemitsu Kosan Co., Ltd., purity: 95.4%, 2.3 mol) and 24.0 g of di-tert-butyl peroxide (PERBUTYL-D, produced by NOF Corporation, purity: 98%, 0.16 mol) were charged. This mixed solution was stirred under heating in an oil bath at 160° C. and thereby reacted for 3 hours. After the reaction, the residual monomer amount was measured by Gas Chromatography (GC) 6850 Series II manufactured by Agilent Technologies. As a result, 76.5% of CEA and 43.7% of 1-dodecene were reacted (copolymerization ratio: CEA/1-dodecene=1/1.43).

From the obtained polymerization solution, monomers were distilled off at a vacuum degree of 2 Torr and a bath temperature of 150° C. by using a vacuum pump. Furthermore, residual monomers and a small amount of low molecular weight oligomers were distilled off at a vacuum degree of 0.3 Pa and a column temperature of 120° C. by using a molecular distillation apparatus, MS-FL Special Model, manufactured by Taika Kogyo Co., Ltd., to obtain a viscous oligomer having an epoxy equivalent of 480.8. The analysis of GPC revealed that the number average molecular weight was 1,600 and the weight average molecular weight was 2,550.

Synthesis Example 4

In a 1 L-volume four-neck flask equipped with a reflux tube, a thermometer, a dropping funnel and a ball cock, 180.0 g of CEA (produced by Showa Denko K.K., 0.99 mol), 103.3 g of 1-tetradecene (LINEALENE-14, produced by Idemitsu Kosan Co., Ltd., purity: 93.9%, 0.49 mol) and 11.1 g of di-tert-butyl peroxide (PERBUTYL-D, produced by NOF Corporation, purity: 98%, 74 mmol) were charged. This mixed solution was stirred under heating in an oil bath at 160° C. and thereby reacted for 3 hours. After the reaction, the residual monomer amount was measured by Gas Chromatography (GC) 6850 Series II manufactured by Agilent Technologies. As a result, 77.3% of CEA and 48.3% of 1-tetradecene were reacted (copolymerization ratio: CEA/1-tetradecene=1/0.31).

From the obtained polymerization solution, monomers were distilled off at a vacuum degree of 2 Torr and a bath temperature of 150° C. by using a vacuum pump. Furthermore, monomers and a small amount of low molecular weight oligomers were distilled off at a vacuum degree of 0.3 Pa and a column temperature of 100° C. by using a molecular distillation apparatus, MS-FL Special Model, manufactured by Taika Kogyo Co., Ltd., to obtain a viscous oligomer having an epoxy equivalent of 276.1. The analysis of GPC revealed that the number average molecular weight was 1,500 and the weight average molecular weight was 2,900.

Synthesis Example 5

In a 1 L-volume four-neck flask equipped with a reflux tube, a thermometer, a dropping funnel and a ball cock, 91.1 g of CEA (produced by Showa Denko K.K., 0.50 mol), 441.1 g of 1-dodecene (LINEALENE-12, produced by Idemitsu Kosan Co., Ltd., purity: 95.4%, 2.50 mol) and 22.4 g of di-tert-butyl peroxide (PERBUTYL-D, produced by NOF Corporation, purity: 98%, 0.15 mol) were charged. This mixed solution was stirred under heating in an oil bath at 160° C. and thereby reacted for 3 hours. After the reaction, the residual monomer amount was measured by Gas Chromatography (GC) 6850 Series II manufactured by Agilent Technologies. As a result, 76.6% of CEA and 39.6% of 1-dodecene were reacted (copolymerization ratio: CEA/1-dodecene=1/2.59).

From the obtained polymerization solution, monomers were distilled off at a vacuum degree of 2 Torr and a bath temperature of 150° C. by using a vacuum pump. Furthermore, monomers and a small amount of low molecular weight oligomers were distilled off at a vacuum degree of 0.3 Pa and a column temperature of 90° C. by using a molecular distillation apparatus, MS-FL Special Model, manufactured by Taika Kogyo Co., Ltd., to obtain a viscous oligomer having an epoxy equivalent of 778.2. The analysis of GPC revealed that the number average molecular weight was 1,500 and the weight average molecular weight was 2,400.

Synthesis Example 6

In a 1 L-volume four-neck flask equipped with a reflux tube, a thermometer, a dropping funnel and a ball cock, 236.9 g of CEA (produced by Showa Denko K.K., 1.30 mol), 229.4 g of 1-dodecene (LINEALENE-12, produced by Idemitsu Kosan Co., Ltd., purity: 95.4%, 1.30 mol) and 19.4 g of di-tert-butyl peroxide (PERBUTYL-D, produced by NOF Corporation, purity: 98%, 0.13 mol) were charged. This mixed solution was stirred under heating in an oil bath at 160° C. and thereby reacted for 3 hours. After the reaction, the residual monomer amount was measured by Gas Chromatography (GC) 6850 Series II manufactured by Agilent Technologies. As a result, 71.0% of CEA and 43.1% of 1-dodecene were reacted (copolymerization ratio: CEA/1-dodecene=1/0.61).

From the obtained polymerization solution, monomers were distilled off at a vacuum degree of 2 Torr and a bath temperature of 150° C. by using a vacuum pump. Furthermore, monomers and a small amount of low molecular weight oligomers were distilled off at a vacuum degree of 0.3 Pa and a column temperature of 100° C. by using a molecular distillation apparatus, MS-FL Special Model, manufactured by Taika Kogyo Co., Ltd., to obtain a viscous oligomer having an epoxy equivalent of 328.1. The analysis of GPC revealed that the number average molecular weight was 1,400 and the weight average molecular weight was 2,200.

Synthesis Example 7

In a 500 mL-volume polyethylene vessel, 120 g of CEA (produced by Showa Denko K.K., 0.66 mol), 138.56 g of 4-methyl-1-pentene (produced by Mitsui Chemicals, Inc., 1.65 mol) and 16.68 g of di-tert-butyl peroxide (produced by NOF Corporation, 0.11 mol) were charged and thoroughly mixed to prepare a synthesis raw material solution. In a personal organic synthesis device, PPV-4060 (simple autoclave), manufactured by Tokyo Rikakikai Co., Ltd., 68.88 g of the synthesis raw material solution was charged, and the inside of the reaction vessel was purged with nitrogen. Thereafter, the reaction vessel was tightly closed, and the reaction was allowed to proceed at an outside temperature of 160° C. for 3 hours. After the reaction, the reaction solution was subjected to quantitative determination of the residual monomer amount by 7890AGC manufactured by Agilent Technologies. As a result, 79.03% of CEA and 49.28% of 4-methyl-1-pentene were reacted and the copolymerization ratio was CEA/4-methyl-1-pentene=1/1.37.

Reaction solutions obtained by repeating the same reaction three times were combined, and the resulting solution was purified by removing monomers and low molecular weight oligomers in the same manner as in Synthesis Example 2 to obtain a viscous CEA-4-methyl-1-pentene copolymer having an epoxy equivalent of 307.76.

Synthesis Example 8

A viscous CEA-1-dodecene copolymer having an epoxy equivalent of 350.98 was obtained by performing the same operation as in Synthesis Example 6 except for using 770.92 g of CEA, 712.01 g of 1-dodecene and 61.82 g of di-tert-butyl peroxide.

Example 27

3.0 Gram of the CEA-1-dodecene copolymer of Synthesis Example 3, 0.54 g of methacrylic acid, 0.03 g of triphenylphosphine, 0.0071 g of hydroquinone monomethyl ether and 3.6 g of toluene were charged and in an oil bath at 120° C. the reaction was allowed to proceed for 2 hours. From the obtained reaction solution, toluene was distilled off at a vacuum degree of 1 Torr and an oil bath temperature of 100° C. by using a vacuum pump.

Figure 5:
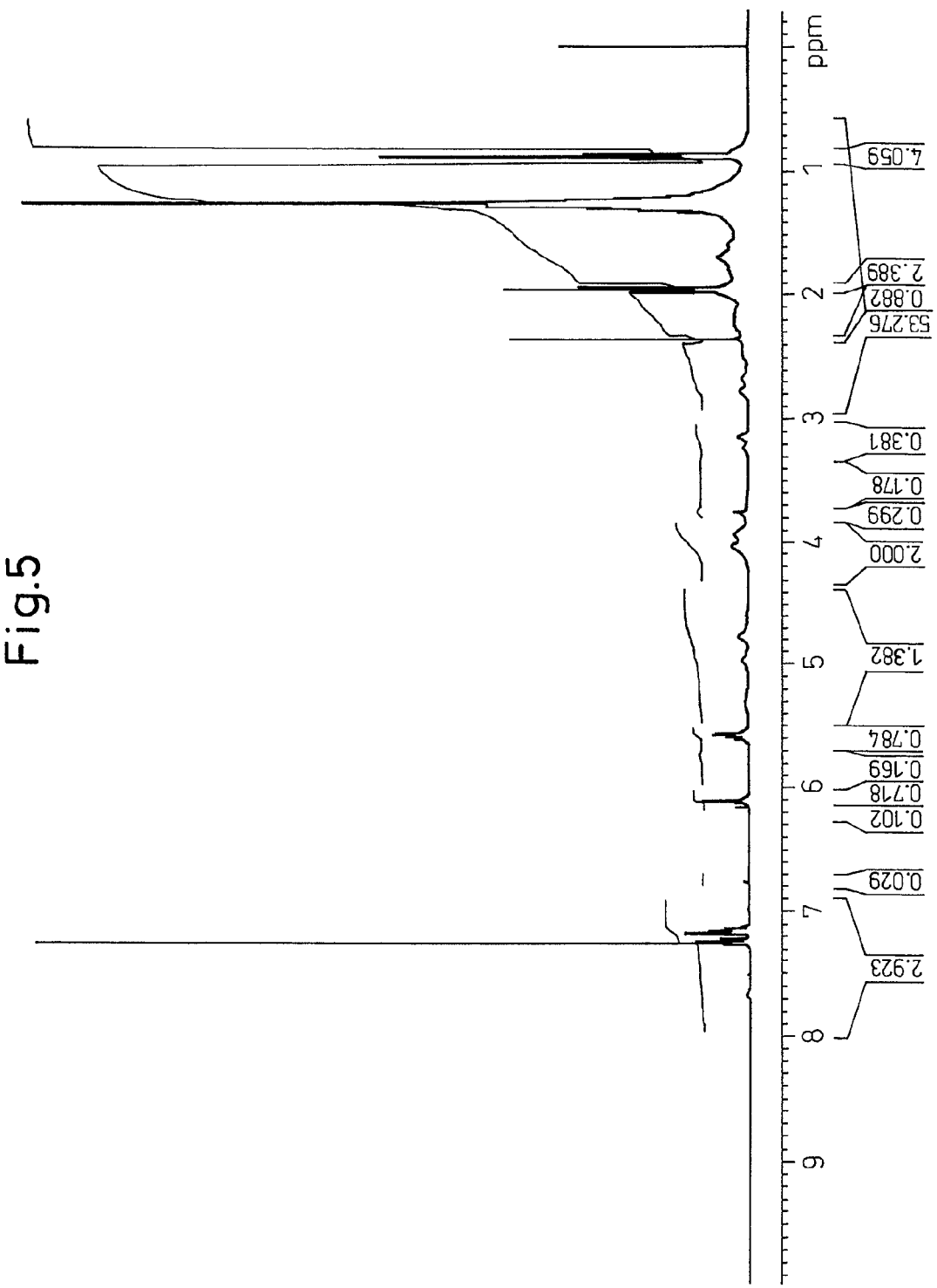
FIG. 5 A $^1$H-NMR spectrum of the compound (epoxy (meth)acrylate copolymer) obtained in Example 27.
Figure 6:
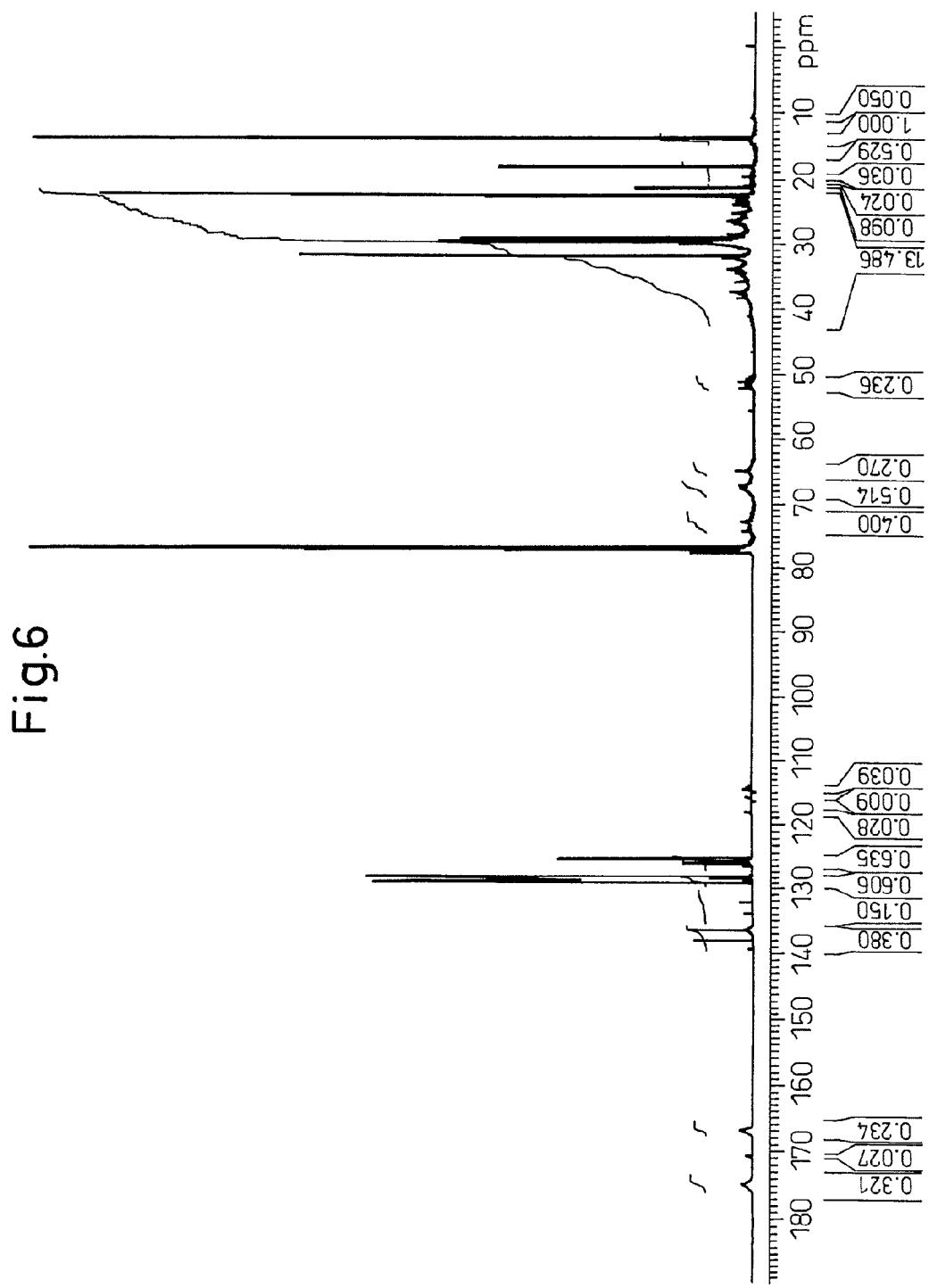
FIG. 6 A $^{13}$C-NMR spectrum of the compound (epoxy (meth)acrylate copolymer) obtained in Example 27.
Figure 7:
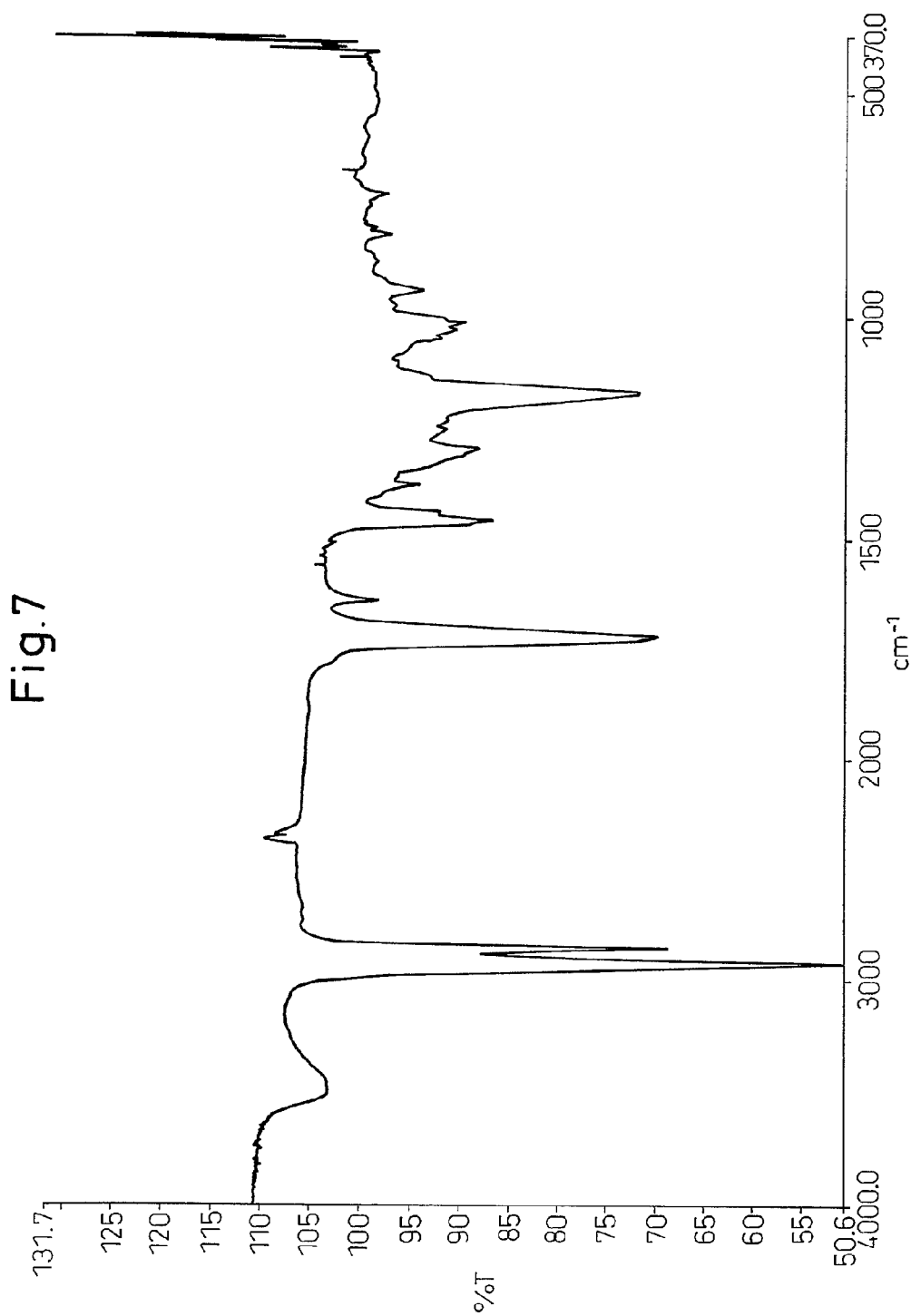
FIG. 7 An IR spectrum of the compound (epoxy (meth) acrylate copolymer) obtained in Example 27.

The $^1$H-NMR spectrum, $^{13}$C-NMR spectrum and IR spectrum of the obtained compound are shown in FIGS. 5 to 7, respectively. From these results, the compound obtained was identified as a mixture containing repeating units of formulae (a1') and (a2') wherein each of $R^1$ to $R^7$ and $R^{12}$ is a hydrogen atom, and $R^{13}$ is a methyl group.

Example 28

3.0 Gram of the CEA-4-methyl-1-pentene copolymer of Synthesis Example 2, 0.81 g of methacrylic acid, 0.03 g of triphenylphosphine, 0.0077 g of hydroquinone monomethyl ether and 3.8 g of toluene were charged and in an oil bath at 120° C. the reaction was allowed to proceed for 2 hours. From the obtained reaction solution, toluene was distilled off at a vacuum degree of 1 Torr and an oil bath temperature of 100° C. by using a vacuum pump.

Figure 8:
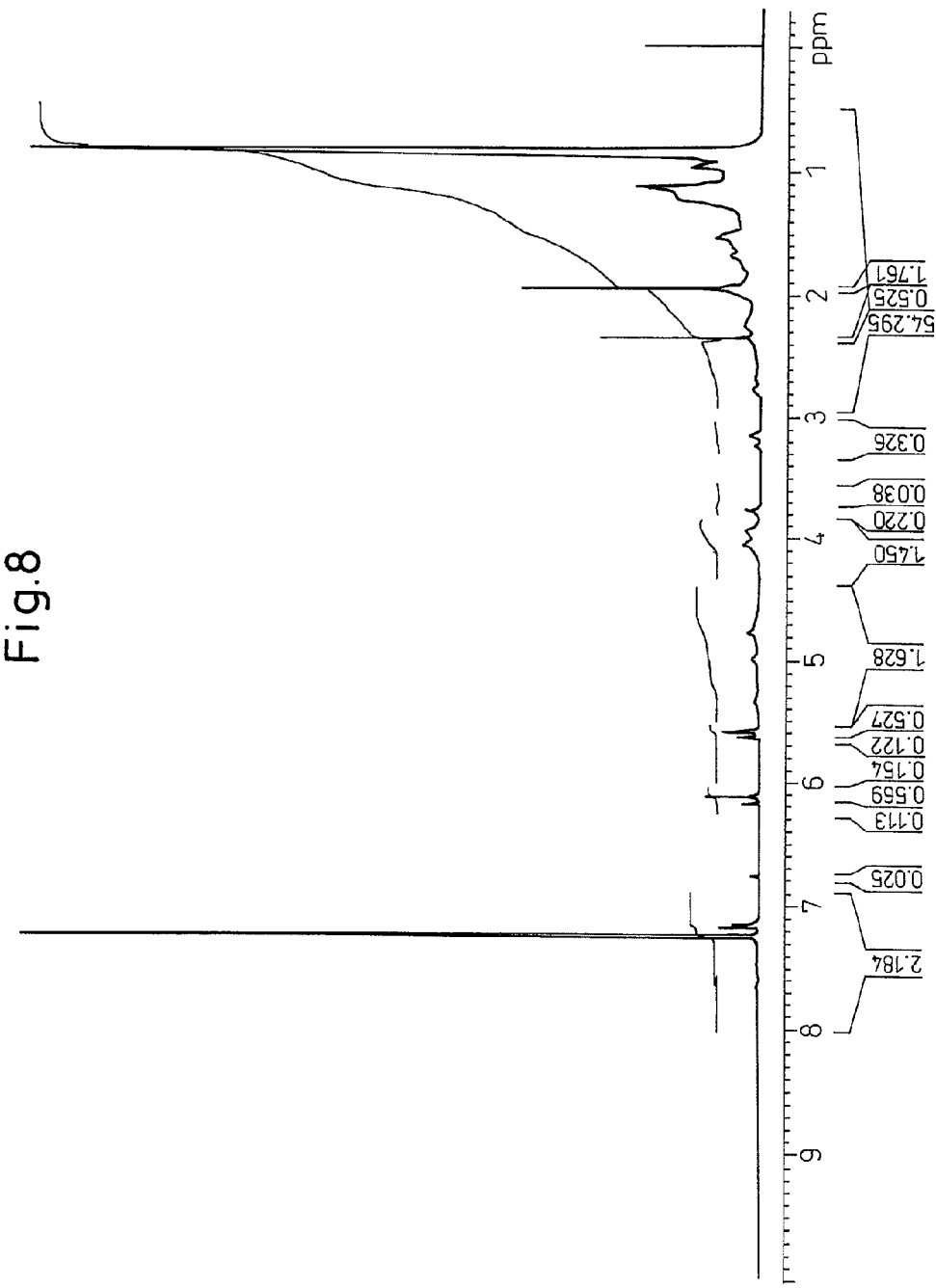
FIG. 8 A $^1$H-NMR spectrum of the compound (epoxy (meth)acrylate copolymer) obtained in Example 28.
Figure 9:
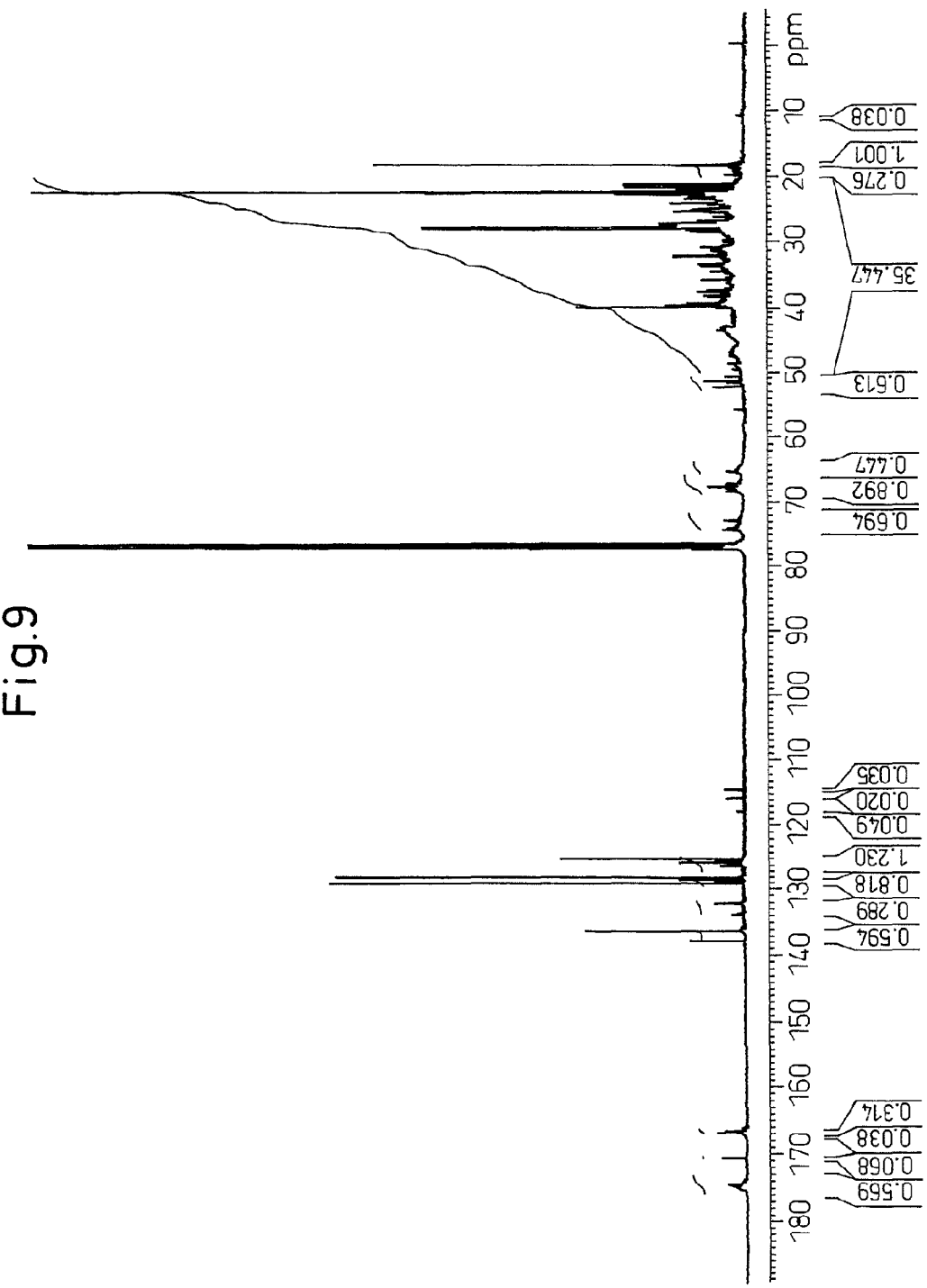
FIG. 9 A $^{13}$C-NMR spectrum of the compound (epoxy (meth)acrylate copolymer) obtained in Example 28.
Figure 10:
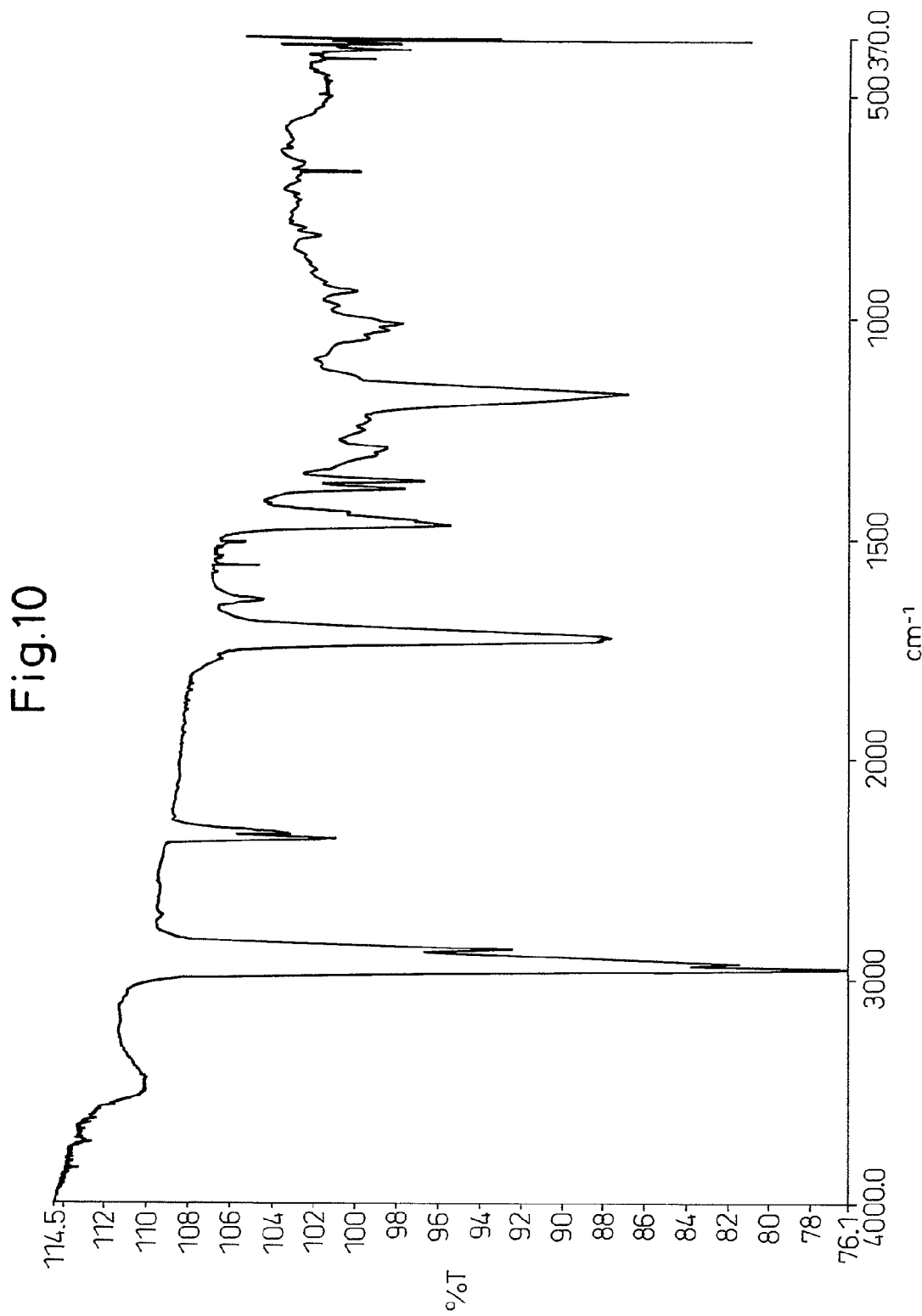
FIG. 10 An IR spectrum of the compound (epoxy (meth) acrylate copolymer) obtained in Example 28.

The $^1$H-NMR spectrum, $^{13}$C-NMR spectrum and IR spectrum of the obtained compound are shown in FIGS. 8 to 10, respectively. From these results, the compound obtained was identified as a mixture containing repeating units of formulae (a1') and (a2') wherein each of $R^1$ to $R^7$ and $R^{12}$ is a hydrogen atom, and $R^{13}$ is a methyl group.

Example 29

3.0 Gram of the CEA-4-methyl-1-pentene copolymer of Synthesis Example 2, 0.67 g of acrylic acid, 0.03 g of triphenylphosphine, 0.0074 g of hydroquinone monomethyl ether and 3.7 g of toluene were charged and in an oil bath at 120° C. the reaction was allowed to proceed for 2 hours. From the obtained reaction solution, toluene was distilled off at a vacuum degree of 1 Torr and an oil bath temperature of 100° C. by using a vacuum pump to obtain a mixture containing repeating units of formulae (a1') and (a2') wherein each of $R^1$ to $R^7$, $R^{12}$ and $R^{13}$ is a hydrogen atom.

Example 30

3.0 Gram of the CEA-1-dodecene copolymer of Synthesis Example 3, 0.45 g of acrylic acid, 0.031 g of triphenylphosphine, 0.0070 g of hydroquinone monomethyl ether and 3.5 g of toluene were charged and in an oil bath at 120° C. the reaction was allowed to proceed for 2 hours. From the obtained reaction solution, toluene was distilled off at a vacuum degree of 1 Torr and an oil bath temperature of 100° C. by using a vacuum pump to obtain a mixture containing repeating units of formulae (a1') and (a2') wherein each of $R^1$ to $R^7$, $R^{12}$ and $R^{13}$ is a hydrogen atom.

Example 31

3.0 Gram of the CEA-1-octene copolymer of Synthesis Example 1, 0.665 g of methacrylic acid, 0.03 g of triphenylphosphine, 0.0074 g of hydroquinone monomethyl ether and 3.7 g of toluene were charged and in an oil bath at 120° C. the reaction was allowed to proceed for 6 hours. From the obtained reaction solution, toluene was distilled off at a vacuum degree of 1 Torr and an oil bath temperature of 100° C. by using a vacuum pump to obtain a mixture containing repeating units of formulae (a1') and (a2') wherein each of $R^1$ to $R^7$ and $R^{12}$ is a hydrogen atom, and $R^{13}$ is a methyl group.

Example 32

60 Gram of the CEA-1-tetradecene copolymer of Synthesis Example 4, 18.7 g of methacrylic acid, 0.6 g of triphenylphosphine, 0.159 g of hydroquinone monomethyl ether and 79 g of ethyl acetate were charged and in an oil bath at 100° C. the reaction was allowed to proceed for 6 hours. From the obtained reaction solution, ethyl acetate was distilled off at a vacuum degree of 1 Torr and an oil bath temperature of 80° C. by using a vacuum pump to obtain a mixture containing repeating units of formulae (a1') and (a2') wherein each of $R^1$ to $R^7$ and $R^{12}$ is a hydrogen atom, and $R^{13}$ is a methyl group.

Example 33

80.0 Gram of the CEA-1-dodecene copolymer of Synthesis Example 5, 8.86 g of methacrylic acid, 0.8 g of triphenylphosphine, 0.18 g of hydroquinone monomethyl ether and 89 g of ethyl acetate were charged and in an oil bath at 100° C. the reaction was allowed to proceed for 6 hours. From the obtained reaction solution, ethyl acetate was distilled off at a vacuum degree of 1 Torr and an oil bath temperature of 80° C. by using a vacuum pump to obtain a mixture containing repeating units of formulae (a1') and (a2') wherein each of $R^1$ to $R^7$ and $R^{12}$ is a hydrogen atom, and $R^{13}$ is a methyl group. The viscosity after removal by distillation was 980 mPa·s, and the analysis of GPC revealed that the number average molecular weight was 1,500 and the weight average molecular weight was 2,400.

Example 34

25.0 Gram of the CEA-1-dodecene copolymer of Synthesis Example 6, 6.56 g of methacrylic acid, 0.25 g of triphenylphosphine, 0.06 g of hydroquinone monomethyl ether and 32 g of ethyl acetate were charged and in an oil bath at 100° C. the reaction was allowed to proceed for 6 hours. From the obtained reaction solution, ethyl acetate was distilled off at a vacuum degree of 1 Torr and an oil bath temperature of 80° C. by using a vacuum pump to obtain a mixture containing repeating units of formulae (a1') and (a2') wherein each of $R^1$ to $R^7$ and $R^{12}$ is a hydrogen atom, and $R^{13}$ is a methyl group. The viscosity after removal by distillation was 4,460 mPa·s, and the analysis of GPC revealed that the number average molecular weight was 1,500 and the weight average molecular weight was 2,300.

Blending-Curing Example 1

In a 150 mL-volume plastic vessel with a lid, 7 g of the resin synthesized in Example 34 and 3 g of KAYARAD DPHA (a reaction product of dipentaerythritol and acrylic acid, produced by Nippon Kayaku Co., Ltd.) were weighed. Thereto, 0.3 g of hydroxycyclohexyl phenyl ketone (Irgacure 184, produced by Ciba Japan) and 0.5 g of fumed silica (AEROSIL R974, produced by Nippon Aerosil Co., Ltd.) were added, and the mixture was kneaded in a rotation/revolution hybrid mixer under the conditions of stirring for 5 minutes and defoaming for 5 minutes to obtain Curable Composition A. The composition obtained was coated by a bar coater on a polyethylene terephthalate film (COSMOSHINE A4100, produced by Toyobo Co., Ltd.) to a thickness of 50 μm and cured by UV irradiation for 180 seconds using an UV irradiator (metal halide lamp with an output of 800 W; 17.7 mW/cm$^2$, as the measured value by an illuminometer).

Blending-Curing Example 2

Gram of the resin synthesized in Example 34 and 0.2 g of dicumyl peroxide (PERCUMYL-D, produced by NOF Corporation) were thoroughly mixed, and the mixture was cast between two 10 cm-square glass plates by using a 0.3 mmϕ silicone tube as a spacer and cured under the conditions of 100° C.-1 hr, 130° C.-1 hr and 160° C.-1 hr.

Each of the resins synthesized in Examples 32 and 33 was cured by the same operation according to the composition shown in Table 3 below. The Tg and bending strength of the resulting cured product were measured in accordance with JIS-K6911, and the results are shown together in Table 3.

The volume shrinkage percentage was calculated by measuring the densities before and after curing of the blend composition. The liquid sample before curing was measured by a vibration digital densitometer, DM-4500 (manufactured by Anton Paar). The cured product was measured by the Archimedes method.

TABLE 3

| | | Blending-Curing Example 2 | Blending-Curing Example 3 | Blending-Curing Example 4 | Blending-Curing Example 5 | Blending-Curing Example 6 |
|---|---|---|---|---|---|---|
| Composition | Example 32 | | | | 4.0 | |
| | Example 33 | | | 4.0 | | |
| | Example 34 | 10.0 | 5.0 | | | |
| | KAYARAD R-654 | | | | 3.0 | |
| | KAYARAD DPHA | | 2.0 | 5.0 | 2.0 | |
| | ACRYESTER IBX | | 3.0 | 1.0 | | |
| | ACRYESTER TD | | | | 1.0 | |
| | VR-77 | | | | | 70.0 |
| | Styrene | | | | | 30.0 |
| | Dicumyl peroxide | 2.0 | 2.0 | 2.0 | 2.0 | 2.0 |
| Volume shrinkage percentage % | | 2.1 | 4.2 | 5.4 | 4.8 | 7.4 |
| Bending | Strength MPa | 36 | 121 | 96 | 109 | 136 |
| | Elastic modulus MPa | 680 | 1750 | 2400 | 2180 | 3450 |
| Tg (glass transition temperature) °C. | | 82 | 142 | 112 | 149 | 115 |

KAYARAD R-654 (produced by Nippon Kayaku Co., Ltd.: tricyclodecanedimethylol diacrylate)
KAYARAD DPHA (produced by Nippon Kayaku Co., Ltd.: a reaction product of dipentaerythritol and acrylic acid)
ACRYESTER IBX (produced by Mitsubishi Rayon Co., Ltd.: isobornyl methacrylate)
ACRYESTER TD (produced by Mitsubishi Rayon Co., Ltd.: tridecyl methacrylate)
VR-77 (produced by Showa Highpolymer Co., Ltd.: bisphenol-A type epoxy acrylate)

Example 35

In a 300 mL-volume separable flask equipped with an oil bath and a Teflon (registered trademark) stirring blade connected to a three-one motor, 90.38 g of the CEA-4-methyl-1-pentene copolymer synthesized in Synthesis Example 7, 21.16 g of special-grade acrylic acid (purchased from Tokyo Chemical Industry Co., Ltd.), 1.12 g of triphenylphosphine (purchased from Tokyo Chemical Industry Co., Ltd.) and 0.12 (g) of hydroquinone monomethyl ether were charged. The mixture was vigorously stirred at a bath temperature of 80 (° C.) for 2 hours in a dry air atmosphere to obtain a mixture containing repeating units of formulae (a1') and (a2') wherein each of $R^1$ to $R^7$, $R^{12}$ and $R^{13}$ is a hydrogen atom.

Example 36

A mixture containing repeating units of formulae (a1') and (a2') wherein each of $R^1$ to $R^7$, $R^{12}$ and $R^{13}$ is a hydrogen atom was obtained by performing the same reaction as in Example 35 except for changing the copolymer to 121.08 g of the CEA-1-dodecene copolymer obtained in Synthesis Example 8.

Example 37

A mixture containing repeating units of formulae (a1') and (a2') wherein each of $R^1$ to $R^7$, $R^{12}$ and $R^{13}$ is a hydrogen atom was obtained by performing the same reaction as in Example 35 except for changing the copolymer to 65.02 g of the CEA-1-dodecene copolymer obtained in Synthesis Example 3.

Example 38

In a 150 mL-volume polyethylene vessel with a lid, 6.27 (g) of the resin synthesized in Example 35 was weighed. Thereto, 0.63 (g) of a propylene glycol monomethyl ether acetate (produced by Daicel Chemical Industries, Ltd.) solution of 1-hydroxy-cyclohexyl-phenyl-ketone (Irgacure 184, produced by Ciba Japan) prepared to a concentration of 30 mass %, 0.32 (g) of AEROSIL R974 (purchased from Nippon Aerosil Co., Ltd.) and 0.77 (g) of propylene glycol monomethyl ether acetate were added, and the mixture was stirred/defoamed in a rotation/revolution hybrid mixer to obtain Coating Solution a. On a substrate having comb-shaped electrodes (L/S=50/50 (μm)) produced by etching a flexible copper-lined laminated plate (trade name: UPISEL-N BE1310 (grade name), produced by Ube Industries, Ltd.), Coating Solution a was coated by a bar coating method to a dry thickness of 50 (μm) and then dried in a hot-air constant temperature bath at 80° C. for 5 minutes. The electrode surface was sealed with the cured product of Coating Solution a by irradiating for 60 seconds using a metal halide lamp-type ultraviolet irradiation apparatus (17.7 mW/cm$^2$) to obtain Insulating Property Test Specimens a1 and a2.

Figure 11:
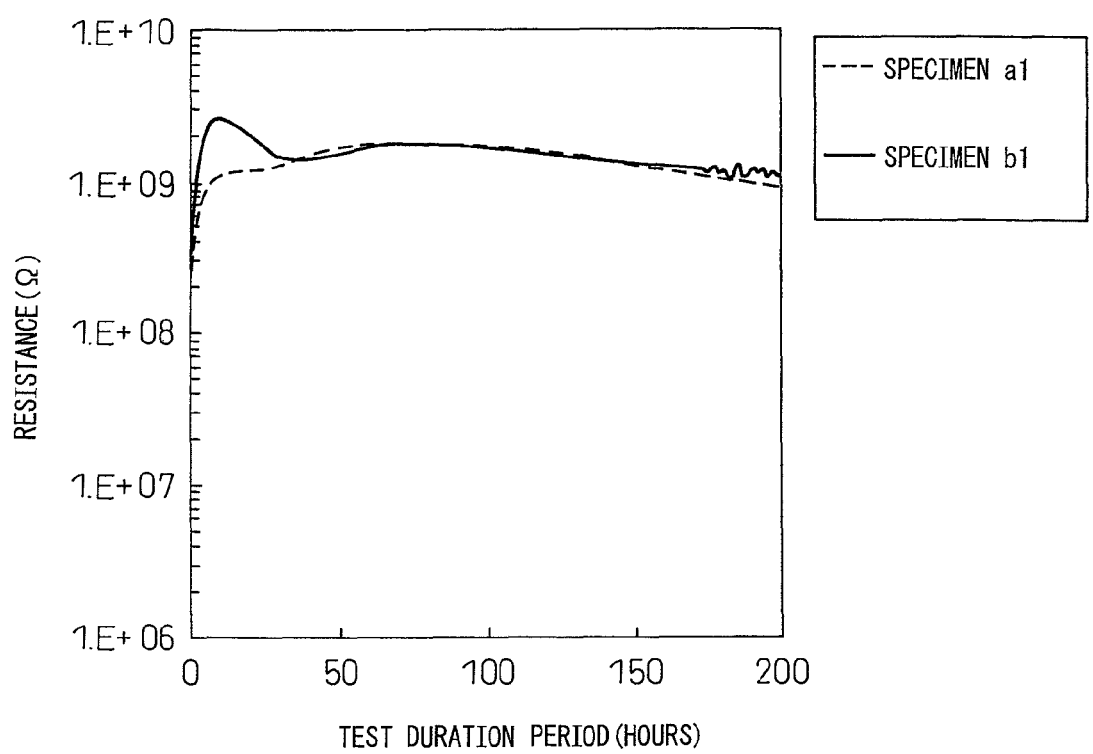
FIG. 11 A graph showing the measurement results of insulation resistance of Test Specimens a1 and b1 obtained in Examples 38 and 39.

Insulating Property Test Specimen a1 was placed in a constant-temperature/constant-humidity bath adjusted to an atmosphere of 120° C. and 95% RH, and the insulation resistance was continuously measured by applying 100 (V) to the electrode. The results are shown in FIG. 11.

Example 39

Coating Solution b and Insulating Property Test Specimens b1 and b2 were obtained by the same operation as in Example 38 except for using 10.86 (g) of the resin obtained in Example 37, and the insulation resistance was continuously measured. The results are shown in FIG. 11.

Example 40

Figure 12:
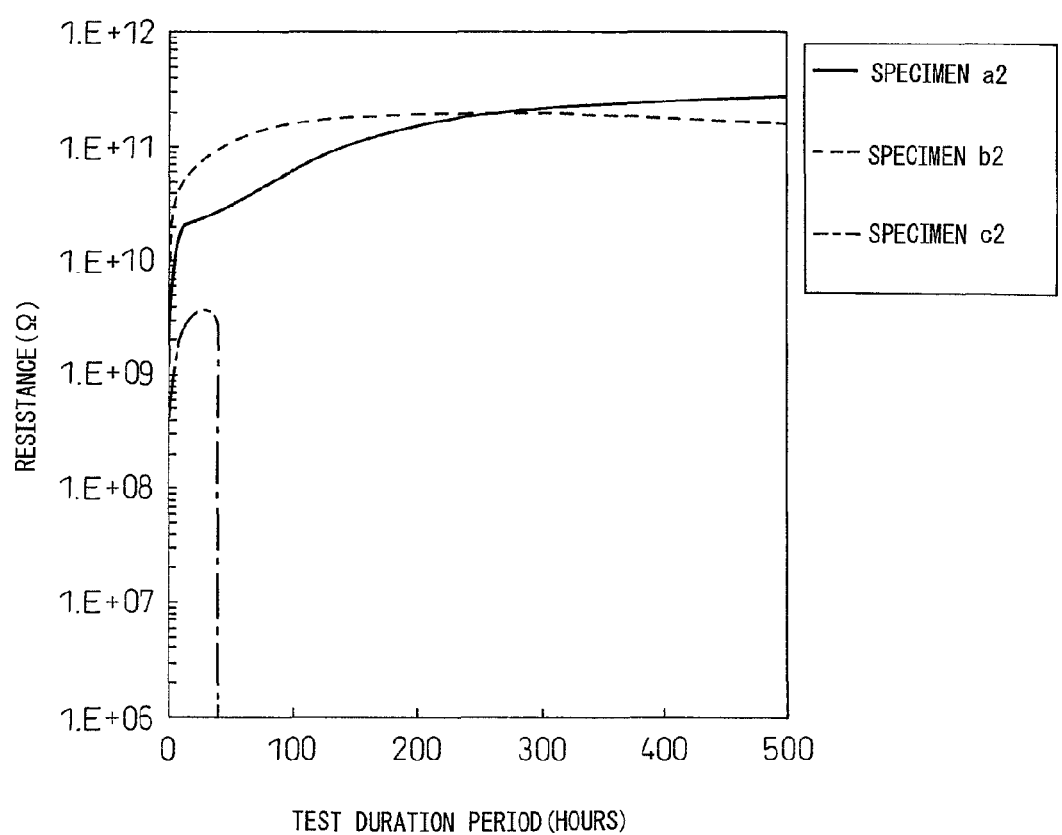
FIG. 12 A graph showing the measurement results of insulation resistance of Test Specimens a2 and b2 obtained in Examples 38 and 39 and Test Specimens c2 obtained in Comparative Example 2.

Insulating Property Test Specimens a2 and b2 were placed in a constant-temperature/constant-humidity bath adjusted to 85° C. and 85% RH, and the insulation resistance was continuously measured by applying 100 (V) to the electrode. The results are shown in FIG. 12.

Comparative Example 2

Coating Solution c and Insulating Property Test Specimens c1 and c2 were obtained in the same manner as in Example 38 except for using a commercially available epoxy acrylate of a bisphenol A-type epoxy resin (EBECRYL 600, produced by DAICEL-CYTEC Company Ltd.).

Test Specimens c1 and c2 were placed in constant-temperature/constant-humidity baths adjusted to 120° C./95% RH and 85° C./85% RH, respectively, and the insulation resistance was continuously measured by applying 100 (V) to the electrode. In Test Specimen c1, the resistance value was reduced to a value lower than $1.0 \times 10^6$ (Ω) set as the threshold lower limit, before the applied voltage reached the predetermined 100 (V), and the insulating property could not be evaluated. In Test Specimen c2, the resistance value was also reduced in a short time to a value lower than $1.0 \times 10^6$ (Ω) set as the threshold lower limit, and the insulation performance was defective. The results of Test Specimen c2 are shown in FIG. 12.

The invention claimed is:

1. An epoxy (meth)acrylate copolymer comprising at least one of repeating units represented by the following formulae (a1'), (a2'), (b1) and (b2):

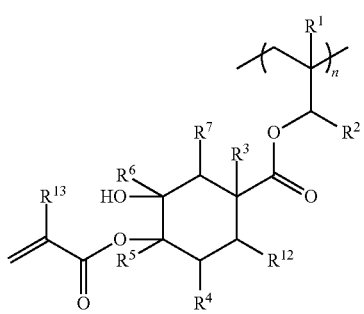
(a1')

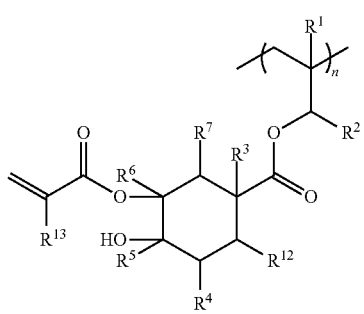
(a2')

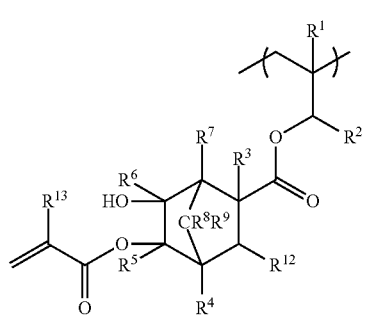
(b1)

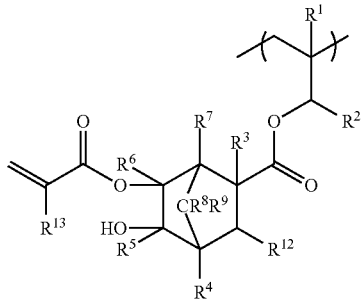
(b2)

wherein each of $R^1$ to $R^9$ and $R^{13}$ is a hydrogen atom or a methyl group, and $R^{12}$ is a hydrogen atom, a methyl group or a phenyl group, and a repeating unit represented by the following formula (d):

(d)

wherein $R^{14}$ is a hydrogen atom or a methyl group, and $R^{15}$ is a hydrogen atom or a saturated or unsaturated hydrocarbon group having a carbon number of 24 or less.

2. The epoxy (meth)acrylate copolymer as claimed in claim 1, wherein the acryl equivalent of said copolymer is from 300 to 3,500 g/eq.

3. The epoxy (meth)acrylate copolymer as claimed in claim 1, wherein the total content of the repeating units represented by formulae (a1'), (a2'), (b1) and (b2) in said copolymer is from 10 to 90 mol%, the content of the repeating unit represented by formula (d) is from 5 to 90 mol%, and the total of the total content of the repeating units represented by formulae(a1'), (a2'), (b1) and (b2), and the content of the repeating unit represented by formula (d) is 100 mol% or less.

4. The epoxy (meth)acrylate copolymer as claimed in claim 1, wherein said copolymer is obtained by reacting an epoxy group-containing copolymer containing at least one of repeating units represented by the following formulae (a) and (b):

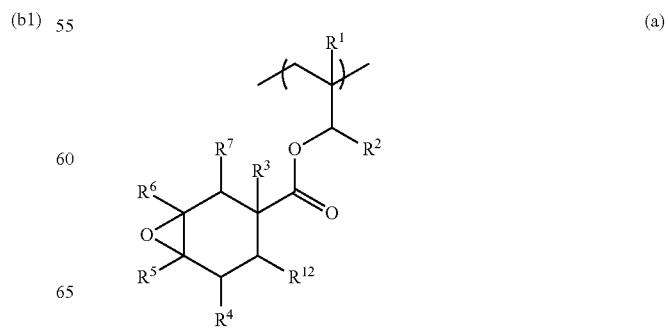
(a) (b)

-continued

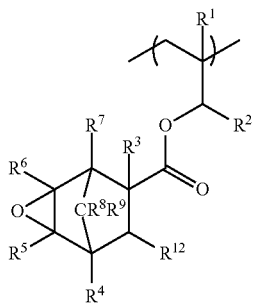

(b)

wherein each of $R^1$ to $R^9$ is a hydrogen atom or a methyl group, and $R^{12}$ is a hydrogen atom, a methyl group or a phenyl group and a repeating unit represented by formula (d), with (meth)acrylic acid.

5. A process for producing the epoxy (meth)acrylate copolymer claimed in claim 4, comprising a step of radically-copolymerizing at least one of monomers containing an epoxy group and an allyl group, represented by the following formulae (1) and (2):

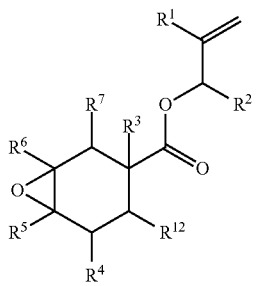

(1)

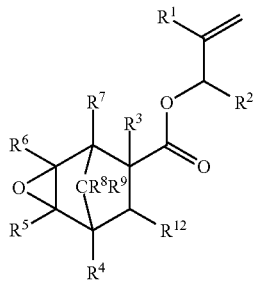

(2)

wherein each of $R^1$ to $R^9$ is a hydrogen atom or a methyl group, and $R^{12}$ is a hydrogen atom, a methyl group or a phenyl group, with an olefin represented by the following formula (4):

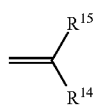

(4)

wherein $R^{14}$ is a hydrogen atom or a methyl group, and $R^{15}$ is a hydrogen atom or a saturated or unsaturated hydrocarbon group having a carbon number of 24 or less, to provide an epoxy group-containing copolymer containing at least one of repeating units represented by formulae (a) and (b), and a repeating unit represented by formula (d), and a step of reacting (meth)acrylic acid with said epoxy group-containing copolymer.

6. The process for producing an epoxy (meth)acrylate copolymer as claimed in claim 5, wherein said monomer containing an epoxy group and an allyl group is at least one of allyl 3,4-epoxycyclohexane-1-carboxylate, allyl 3,4-epoxy-1-methylcyclohexanecarboxylate and allyl 3,4-epoxy-6-phenylcyclohexanecarboxylate and said olefin is at least one of ethylene, 4-methyl-1-pentene, 1-hexene, 1-octene, 1-decene, 1-dodecene, 1-tetradecene, 1-hexadecene and 1-octadecene.

7. The process for producing an epoxy (meth)acrylate copolymer as claimed in claim 5, wherein the epoxy equivalent of said epoxy group-containing copolymer is from 190 to 3,000 g/eq.

* * * * *